US012700961B2

(12) United States Patent
Siefken et al.

(10) Patent No.: US 12,700,961 B2
(45) Date of Patent: Aug. 4, 2026

(54) DRIVE THROUGH AUDIO COMMUNICATION SYSTEM WITH MULTI-LANE SUPPORT

(71) Applicant: Xenial, Inc., Charlotte, NC (US)

(72) Inventors: Christopher Siefken, Charlotte, NC (US); Tushar Dabhade, Charlotte, NC (US); Michael Roth, Doylestown, PA (US); Israel Rivera, Philadelphia, PA (US); Arjun Wadwalkar, Charlotte, NC (US)

(73) Assignee: Xenial, Inc., Charlotte, NC (US)

( * ) Notice: Subject to any disclaimer, the term of this patent is extended or adjusted under 35 U.S.C. 154(b) by 0 days.

(21) Appl. No.: 19/225,727

(22) Filed: Jun. 2, 2025

(65) Prior Publication Data

US 2025/0293824 A1 Sep. 18, 2025

Related U.S. Application Data

(63) Continuation of application No. 18/607,065, filed on Mar. 15, 2024, now Pat. No. 12,381,673.

(Continued)

(51) Int. Cl.
*H04W 4/00* (2018.01)
*H04L 5/00* (2006.01)
(Continued)

(52) U.S. Cl.
CPC ........... *H04L 5/0046* (2013.01); *H04R 1/023* (2013.01); *H04R 1/028* (2013.01); *H04R 3/00* (2013.01)

(58) Field of Classification Search
CPC ....... H04L 5/0046; H04R 1/023; H04R 1/028; H04R 3/00
(Continued)

(56) References Cited

U.S. PATENT DOCUMENTS 5,235,509 A 8/1993 Mueller et al.
5,974,393 A 10/1999 Mccullough
(Continued)

FOREIGN PATENT DOCUMENTS

CA 2204420 C 9/2005
EP 2 390 775 A2 11/2011
(Continued)

OTHER PUBLICATIONS

U.S. Appl. No. 19/027,408, filed Jan. 17, 2025, Xenial, Inc.
(Continued)

*Primary Examiner* — Marceau Milord
(74) *Attorney, Agent, or Firm* — Foley & Lardner LLP

(57) ABSTRACT

A communications system for a restaurant includes multiple field communications units, a portable communications device, and processing circuitry. The field communications units include a speaker and a microphone. The portable communications device is transportable by an order taker of the restaurant. The processing circuitry obtains a user input to transition the portable communications device between multiple different channels. The multiple different channels correspond to one of the multiple field communications units. The processing circuitry transitions the portable communications device to one of the multiple different channels according to the user input. The processing circuitry facilitates end-to-end bi-directional audio communication between the order taker and a customer by operating the portable communications device and the one of the multiple field communications units to exchange audio data over the one of the multiple different channels.

20 Claims, 19 Drawing Sheets

Related U.S. Application Data

(60) Provisional application No. 63/529,850, filed on Jul. 31, 2023.

(51) Int. Cl.
  *H04R 1/02* (2006.01)
  *H04R 3/00* (2006.01)

(58) Field of Classification Search
  USPC .......................................................... 370/329
  See application file for complete search history.

(56) References Cited

U.S. PATENT DOCUMENTS

| | | | |
|---|---|---|---|
| 6,940,393 | B2 | 9/2005 | Dev et al. |
| 6,996,460 | B1 | 2/2006 | Krahnstoever et al. |
| 7,082,314 | B2 | 7/2006 | Farmer et al. |
| 8,271,340 | B2 | 9/2012 | Awiszus |
| 8,401,230 | B2 | 3/2013 | Kozitsky et al. |
| 8,774,462 | B2 | 7/2014 | Kozitsky et al. |
| 9,324,002 | B2 | 4/2016 | Ryan et al. |
| 9,865,056 | B2 | 1/2018 | Bernal et al. |
| 9,904,903 | B1 | 2/2018 | Weiss et al. |
| 10,082,020 | B2 | 9/2018 | Wisniewski et al. |
| 10,089,983 | B1 | 10/2018 | Gella et al. |
| 10,223,596 | B1 | 3/2019 | Edwards et al. |
| RE47,380 | E | 5/2019 | Bridgman et al. |
| 10,373,226 | B1 | 8/2019 | Russell et al. |
| 10,387,945 | B2 | 8/2019 | Burry et al. |
| 10,453,216 | B1 | 10/2019 | Zelenskiy et al. |
| 10,706,846 | B1 | 7/2020 | Barton et al. |
| 10,993,088 | B1 | 4/2021 | O'Gwynn et al. |
| 11,023,955 | B1 | 6/2021 | Carpenter, II et al. |
| 11,030,678 | B2 | 6/2021 | Panigrahi et al. |
| 11,049,198 | B1 | 6/2021 | Momin et al. |
| 11,068,966 | B2 | 7/2021 | Burry et al. |
| 11,182,864 | B1 | 11/2021 | Fox |
| 11,244,681 | B1 | 2/2022 | Siefken et al. |
| 11,272,238 | B2 | 3/2022 | Friedlander et al. |
| 11,354,760 | B1 | 6/2022 | Dorch et al. |
| 11,443,260 | B1 | 9/2022 | Van Breen |
| 11,574,345 | B2 * | 2/2023 | Dorch .................... G06Q 50/12 |
| 11,594,049 | B2 | 2/2023 | Desantola et al. |
| 11,676,592 | B2 * | 6/2023 | Sumpter ............ G06Q 10/0631 704/275 |
| 11,704,753 | B2 * | 7/2023 | Dorch .................. G06V 40/172 705/15 |
| 11,727,510 | B2 * | 8/2023 | Rosas-Maxemin .......................... G06Q 20/4015 705/15 |
| 11,741,529 | B2 | 8/2023 | Siefken et al. |
| 11,755,836 | B1 * | 9/2023 | Carpenter, II ........ G06F 40/279 704/270 |
| 11,798,106 | B2 | 10/2023 | Fox |
| 11,810,550 | B2 * | 11/2023 | Shukla ............... G06Q 30/0631 |
| 11,862,157 | B2 * | 1/2024 | Aggarwal ............... G06Q 50/12 |
| 11,895,675 | B2 | 2/2024 | O'Gwynn et al. |
| 12,105,780 | B2 * | 10/2024 | Park ..................... G06V 40/172 |
| 12,182,890 | B2 | 12/2024 | Rosas-Maxemin et al. |
| 12,217,301 | B1 | 2/2025 | Villamar |
| 12,282,876 | B2 | 4/2025 | Bjelcevic et al. |
| 2001/0002467 | A1 | 5/2001 | Ogo |
| 2002/0016747 | A1 | 2/2002 | Razumov |
| 2002/0156682 | A1 | 10/2002 | Dipietro |
| 2003/0018531 | A1 | 1/2003 | Mahaffy et al. |
| 2003/0195821 | A1 | 10/2003 | Kennamer |
| 2004/0035643 | A1 | 2/2004 | Dev et al. |
| 2004/0035644 | A1 | 2/2004 | Ford et al. |
| 2004/0210474 | A1 | 10/2004 | Hart et al. |
| 2004/0249497 | A1 | 12/2004 | Saigh et al. |
| 2004/0260513 | A1 | 12/2004 | Fitzpatrick et al. |
| 2005/0200455 | A1 | 9/2005 | Veni et al. |
| 2006/0076397 | A1 | 4/2006 | Langos |
| 2006/0218057 | A1 | 9/2006 | Fitzpatrick et al. |
| 2007/0007331 | A1 | 1/2007 | Jasper et al. |
| 2007/0022016 | A1 | 1/2007 | Steres et al. |
| 2007/0174142 | A1 | 7/2007 | Kissel, Jr. |
| 2007/0230791 | A1 | 10/2007 | Chellapilla et al. |
| 2008/0107304 | A1 | 5/2008 | Coulter et al. |
| 2009/0255195 | A1 | 10/2009 | Bridgman et al. |
| 2010/0205640 | A1 | 8/2010 | Steinborn et al. |
| 2010/0250374 | A1 | 9/2010 | Downes |
| 2011/0166967 | A1 | 7/2011 | Bernstein |
| 2011/0258058 | A1 | 10/2011 | Carroll et al. |
| 2012/0106781 | A1 | 5/2012 | Kozitsky et al. |
| 2012/0109760 | A1 | 5/2012 | Koiso |
| 2013/0106595 | A1 | 5/2013 | Loce et al. |
| 2013/0216102 | A1 | 8/2013 | Ryan et al. |
| 2013/0282420 | A1 | 10/2013 | Paul et al. |
| 2014/0267793 | A1 | 9/2014 | Wang et al. |
| 2014/0279080 | A1 | 9/2014 | O'Gwynn |
| 2015/0070471 | A1 | 3/2015 | Loce et al. |
| 2015/0193755 | A1 | 7/2015 | Sibble |
| 2015/0310459 | A1 | 10/2015 | Bernal et al. |
| 2015/0310615 | A1 | 10/2015 | Bulan et al. |
| 2016/0063459 | A1 | 3/2016 | Li et al. |
| 2016/0155328 | A1 | 6/2016 | Bernal et al. |
| 2016/0244311 | A1 | 8/2016 | Burks et al. |
| 2016/0342841 | A1 | 11/2016 | Bulan et al. |
| 2017/0018041 | A1 | 1/2017 | Fox |
| 2017/0323370 | A1 | 11/2017 | Burry et al. |
| 2017/0323505 | A1 | 11/2017 | Gaddam et al. |
| 2018/0012318 | A1 | 1/2018 | Li et al. |
| 2018/0025365 | A1 | 1/2018 | Wilkinson et al. |
| 2018/0025445 | A1 | 1/2018 | Becker et al. |
| 2018/0082234 | A1 | 3/2018 | Burt et al. |
| 2018/0122022 | A1 | 5/2018 | Kelly et al. |
| 2018/0189781 | A1 | 7/2018 | Mccann et al. |
| 2018/0201227 | A1 | 7/2018 | Gao et al. |
| 2019/0012625 | A1 | 1/2019 | Lawrenson et al. |
| 2019/0108566 | A1 * | 4/2019 | Coleman ........... G06Q 30/0633 |
| 2019/0139258 | A1 | 5/2019 | Slattery et al. |
| 2019/0171711 | A1 * | 6/2019 | Carpenter, II .......... G10L 15/26 |
| 2019/0228463 | A1 | 7/2019 | Chan et al. |
| 2019/0279181 | A1 | 9/2019 | Kelly et al. |
| 2019/0287191 | A1 | 9/2019 | Cummings |
| 2020/0005267 | A1 | 1/2020 | Siefken et al. |
| 2020/0034848 | A1 | 1/2020 | Seo et al. |
| 2020/0189847 | A1 | 6/2020 | Montgomery |
| 2020/0202462 | A1 | 6/2020 | Muyskens |
| 2020/0211130 | A1 | 7/2020 | Zanaroli |
| 2020/0226667 | A1 | 7/2020 | Kalaimani |
| 2020/0250771 | A1 | 8/2020 | Nagata et al. |
| 2020/0272176 | A1 | 8/2020 | Mccann |
| 2020/0311804 | A1 * | 10/2020 | Buckholdt ......... G06Q 30/0641 |
| 2020/0410421 | A1 | 12/2020 | Nelson et al. |
| 2021/0295412 | A1 | 9/2021 | Phillips et al. |
| 2021/0406797 | A1 | 12/2021 | Gui et al. |
| 2022/0036898 | A1 | 2/2022 | Siefken et al. |
| 2022/0165262 | A1 * | 5/2022 | Sumpter ............ G06Q 10/0631 |
| 2022/0237543 | A1 | 7/2022 | Bjelcevic et al. |
| 2022/0237713 | A1 * | 7/2022 | Rosas-Maxemin .......................... G06V 40/172 |
| 2022/0284488 | A1 | 9/2022 | Bamadhaj |
| 2022/0292618 | A1 | 9/2022 | Desantola et al. |
| 2022/0292834 | A1 | 9/2022 | Desantola et al. |
| 2022/0292853 | A1 | 9/2022 | Desantola et al. |
| 2022/0301082 | A1 * | 9/2022 | Dorch .................... G10L 15/18 |
| 2022/0318860 | A1 * | 10/2022 | Dorch .................... G10L 15/28 |
| 2022/0374884 | A1 | 11/2022 | Wai et al. |
| 2022/0382504 | A1 | 12/2022 | Cioarga et al. |
| 2023/0061441 | A1 | 3/2023 | Morgan et al. |
| 2023/0169612 | A1 | 6/2023 | Liguori et al. |
| 2023/0200569 | A1 | 6/2023 | Todoran et al. |
| 2023/0206358 | A1 | 6/2023 | Fox |
| 2023/0298087 | A1 | 9/2023 | Nelson et al. |
| 2023/0298350 | A1 | 9/2023 | Heritier |
| 2023/0316218 | A1 | 10/2023 | Davies et al. |
| 2023/0316788 | A1 | 10/2023 | Desantola et al. |
| 2023/0343102 | A1 | 10/2023 | Hauke et al. |
| 2023/0344905 | A1 | 10/2023 | Davis et al. |
| 2024/0119393 | A1 | 4/2024 | Schwenker et al. |
| 2024/0119398 | A1 | 4/2024 | Schwenker et al. |
| 2024/0119488 | A1 | 4/2024 | Schwenker et al. |

(56) References Cited

U.S. PATENT DOCUMENTS

| | | | |
|---|---|---|---|
| 2024/0131718 A1 | 4/2024 | Tulsidas | |
| 2024/0144401 A1 | 5/2024 | Morgan et al. | |
| 2024/0379101 A1* | 11/2024 | Bhuwalka | G06F 3/167 |

FOREIGN PATENT DOCUMENTS

| | | | |
|---|---|---|---|
| JP | 2012-098841 A | 5/2012 |
| KR | 102134392 B1 | 7/2020 |
| KR | 10-2666989 B1 | 5/2024 |
| KR | 2666989 B1 | 5/2024 |
| WO | WO-99/50733 A2 | 10/1999 |
| WO | WO-2005/041071 A1 | 5/2005 |
| WO | WO-2019/028552 A1 | 2/2019 |
| WO | WO-2022/192705 A2 | 9/2022 |

OTHER PUBLICATIONS

U.S. Appl. No. 18/606,958, filed Mar. 15, 2024, Xenial, Inc.
U.S. Appl. No. 18/607,011, filed Mar. 15, 2024, Xenial, Inc.
U.S. Appl. No. 63/452,218, filed Mar. 15, 2023, Xenial, Inc.
U.S. Appl. No. 63/529,850, filed Jul. 31, 2023, Xenial, Inc.
U.S. Appl. No. 63/539,920, filed Sep. 22, 2023, Xenial, Inc.
U.S. Appl. No. 63/587,611, filed Oct. 3, 2023, Xenial, Inc.

Emery, B. G., Hodges, B., & Tiger, A. (2017). Simulating the impact of mobile ordering at chick-fil-A. Journal of Marketing Development and Competitiveness, 11(1), 51-58. Retrieved from https://www.proquest.com/scholarly-journals/simulating-impact-mobile-ordering-at-chick-fil/docview/1930104172/se-2.
International Search Report and Written Opinion of the International Searching Authority issued in Application No. PCT/US2024/020236, mailed May 10, 2024.
International Search Report and Written Opinion of the International Searching Authority issued in Application No. PCT/US2024/020256, mailed Jun. 14, 2024.
International Search Report and Written Opinion of the International Searching Authority issued in Application No. PCT/US2024/020310, mailed May 2, 2024.
Non-Final Office Action on U.S. Appl. No. 18/607,065 DTD Jun. 18, 2024.
Severson, K. (Nov. 10, 2023). A faster, smoother way to grab a bite fast-food industry embraces shift after pandemic, rolls out drive-thru upgrades. The Baltimore Sun Retrieved from https://www.proquest.com/newspapers/faster-smoother-way-grab-bite-fast-food-industry/docview/2887932639/se-2 (Year: 2023).
US Corrected Notice of Allowance on U.S. Appl. No. 18/607,065 mailed Feb. 26, 2025.
US Notice of Allowance on U.S. Appl. No. 18/607,065 mailed Aug. 30, 2024.

* cited by examiner

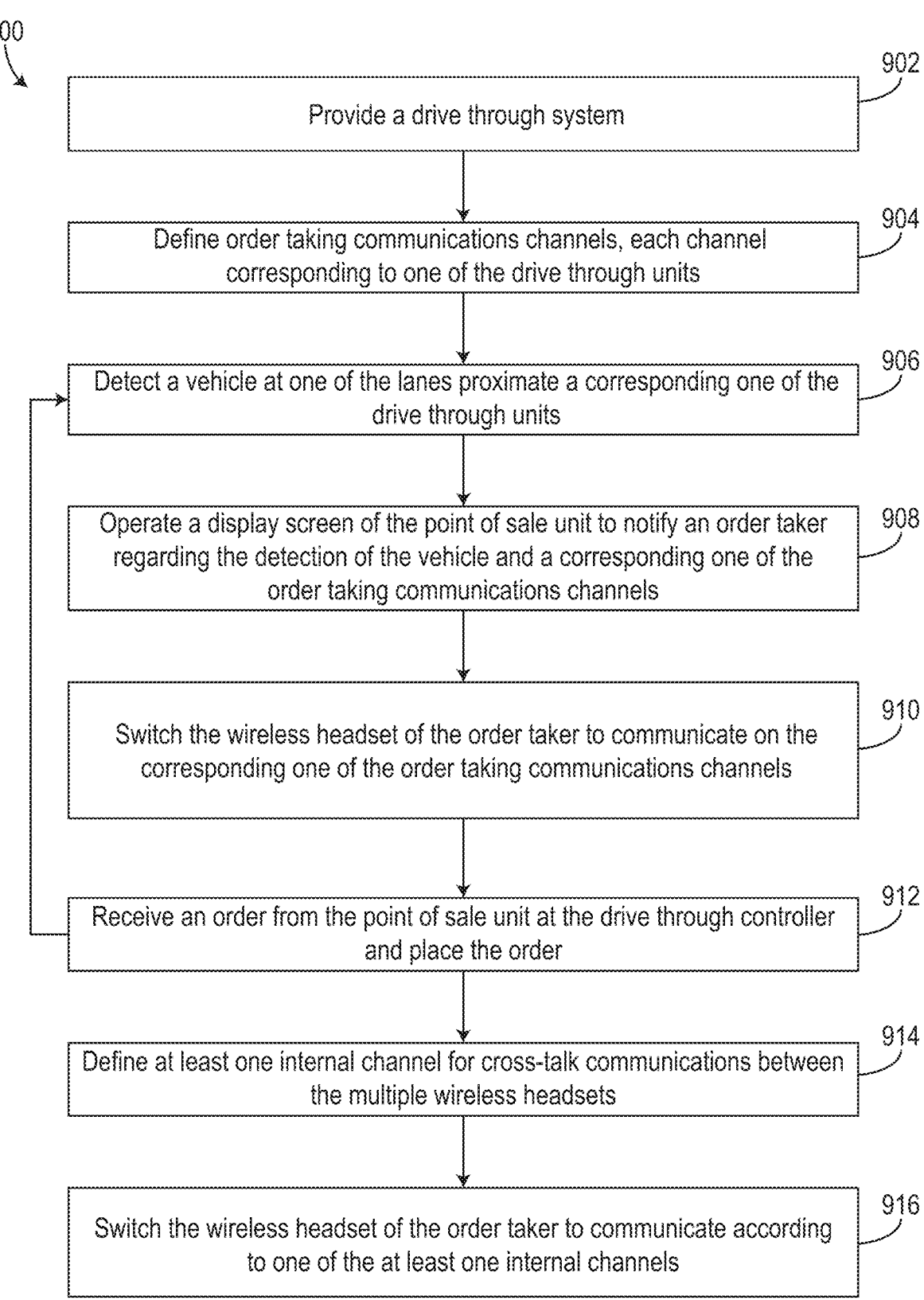

900

902
Provide a drive through system

904
Define order taking communications channels, each channel corresponding to one of the drive through units 906
Detect a vehicle at one of the lanes proximate a corresponding one of the drive through units 908
Operate a display screen of the point of sale unit to notify an order taker regarding the detection of the vehicle and a corresponding one of the order taking communications channels 910
Switch the wireless headset of the order taker to communicate on the corresponding one of the order taking communications channels 912
Receive an order from the point of sale unit at the drive through controller and place the order 914
Define at least one internal channel for cross-talk communications between the multiple wireless headsets 916
Switch the wireless headset of the order taker to communicate according to one of the at least one internal channels

FIG. 9

Interior Connectors 1128
1130
1132
1134
1136
1138

1118

Bridge Board - Rev A

1118

Outside Wire Entry

1118

1120
1122
1124
1126

DRIVE THROUGH AUDIO COMMUNICATION SYSTEM WITH MULTI-LANE SUPPORT

CROSS-REFERENCE TO RELATED PATENT APPLICATION

This application is a continuation of U.S. patent application Ser. No. 18/607,065, filed Mar. 15, 2024, which claims the benefit of and priority to U.S. Provisional Application No. 63/529,850, filed Jul. 31, 2023, the entire disclosures of which are incorporated by reference herein.

FIELD

The present disclosure relates to communications systems. More specifically, the present disclosure relates to communications systems for drive throughs.

BACKGROUND

Drive through systems may have multiple lanes with a combination of display interfaces, microphones, speakers, and vehicle detection capabilities.

SUMMARY

One implementation of the present disclosure is a communications system for a restaurant, according to some embodiments. In some embodiments, the communications system includes multiple field communications units, a portable communications device, and processing circuitry. The field communications units include a speaker and a microphone, according to some embodiments. The portable communications device is transportable by an order taker of the restaurant, according to some embodiments. The processing circuitry configured to obtain a user input to transition the portable communications device between multiple different channels, according to some embodiments. In some embodiments, the multiple different channels correspond to one of the multiple field communications units. The processing circuitry is also configured to transition the portable communications device to one of the multiple different channels according to the user input, according to some embodiments. The processing circuitry is also configured to conduct end-to-end bi-directional audio communication between the order taker and a customer by operating the portable communications device and the one of the multiple field communications units to exchange audio data over the one of the multiple different channels.

In some embodiments, either (a) all of the multiple field communications units include the speaker and the microphone disposed on a unit that includes a display screen or (b) one or more of the multiple field communications units include the speaker and the microphone disposed on a separate unit positioned proximate a unit that includes a display screen. In some embodiments, the portable communications device is a first of multiple portable communications devices. The communications system further includes multiple point of sale units, according to some embodiments. In some embodiments, the user input is configured to be obtained at any of the point of sale units to transition a corresponding one of the portable communications device to one of the multiple different channels, or at any of the portable communications devices.

In some embodiments, display screens of all of the point of sale units are updated in unison to provide a visual indication as to which of the multiple different channels one of the portable communications devices is currently connected. In some embodiments, the point of sale units include touch screen devices. The touch screen devices may be configured to both (a) provide a graphical user interface (GUI) to visually indicate which of the field communications units at which a vehicle currently present, and to also visually indicate which of the field communications units at which the vehicle has not yet been served, and (b) receive the user input as a selection of one of the field communications units. In some embodiments, the GUI of the point of sale units is further configured to present menu data and receive user selections to add items to an order and implement a point of sale.

In some embodiments, the processing circuitry is further configured to obtain sensor data indicative of a presence of a vehicle at one of the field communications units. In some embodiments, the processing circuitry is further configured to operate a display screen of a point of sale unit to notify the order taker regarding the presence of the vehicle at the one of the field communications units to prompt the order taker to provide the user input. The point of sale unit may be configured to receive the user input to initiate the transition of the portable communications device to the one of the multiple different channels.

Another implementation of the present disclosure is a drive through system for a restaurant, according to some embodiments. In some embodiments, the drive through system includes a first drive through unit, a second drive through unit, a third drive through unit, and a fourth drive through unit. In some embodiments, the drive through system includes multiple portable communications devices. In some embodiments, the drive through system include multiple point of sale units and processing circuitry. The first drive through unit is positioned at a first lane, the second drive through unit is positioned at a second lane, the third drive through unit is positioned at a third lane, and the fourth drive through unit is positioned at a fourth lane, according to some embodiments. One or more of the drive through units include a speaker and a microphone. The portable communications devices are each configured to be utilized by a corresponding one of multiple order takers, according to some embodiments. One or more of the point of sale units include a display screen and are configured to receive an input from the order takers. The processing circuitry is configured to define a first order taking channel corresponding to the first drive through unit, a second order taking channel corresponding to the second drive through unit, a third order taking channel corresponding to the third drive through unit, and a fourth order taking channel corresponding to the fourth drive through unit, according to some embodiments. The processing circuitry is also configured to obtain a user input from one of the point of sale units, according to some embodiments. In some embodiments, the user input includes a request to transition a corresponding one of the portable communications device from (i) a first of the first order taking channel, the second order taking channel, the third order taking channel, or the fourth order taking channel to (ii) a second of the first order taking channel, the second order taking channel, the third order taking channel, or the fourth order taking channel. In some embodiments, the processing circuitry is configured to cause the corresponding one of the portable communications devices to transition from (i) the first of the first order taking channel, the second order taking channel, the third order taking channel, or the fourth order taking channel to (ii) the second of the first order taking channel, the second order taking channel, the third order taking channel, or the fourth order taking channel, in response to the user input.

In some embodiments, the first drive through unit is configured to communicate on the first order taking channel, the second drive through unit is configured to communicate on the second order taking channel, the third drive through unit is configured to communicate on the third order taking channel, and the fourth drive through unit is configured to communicate on the fourth order taking channel. In some embodiments, the portable communications devices include a microphone and a speaker. In some embodiments, the speaker is configured to produce sound in response to receiving audio data or audio signals, and the microphone is configured to receive sound and generate audio data or audio signals.

In some embodiments, the drive through system further include a vehicle detection system configured to detect a presence of a customer vehicle at any of the first drive through unit, the second drive through unit, the third drive through unit, or the fourth drive through unit. In some embodiments, the processing circuitry is configured to operate the display screens of the one or more of the point of sale units to provide a graphical user interface (GUI). The GUI includes multiple selectable icons. Each of the selectable icons correspond to one of the first order taking channel, the second order taking channel, the third order taking channel, or the fourth order taking channel. The processing circuitry is configured to perform certain operations, responsive to both (i) detection of the customer vehicle at one of the first drive through unit, the second drive through unit, the third drive through unit, or the fourth drive through unit, and (ii) a determination that none of the portable communications devices are currently switched to the one of the first order taking channel, the second order taking channel, the third order taking channel, or the third order taking channel corresponding to the one of the first drive through unit, the second drive through unit, the third drive through unit, or the fourth drive through unit at which the customer vehicle is detected, and in particular is configured to operate the display screens of the one or more of the point of sale units to increase a conspicuity of one of the selectable icons to prompt one of the order takers to switch, via selection of the one of the selectable icons with increased conspicuity, a corresponding one of the portable communications devices to the one of the first order taking channel, the second order taking channel, the third order taking channel, or the fourth order taking channel to communicate with a customer via the drive through unit at which the customer vehicle is detected.

In some embodiments, one or more of the portable communications devices are configured to wirelessly communicate with the processing circuitry according to a wireless communications protocol, the plurality of portable communications devices having a communications range relative to a base station of at least 30 meters. In some embodiments, the processing circuitry is configured to define at least one internal channel. The portable communications devices are switchable onto the at least one internal channel to conduct cross-talk communications between the portable communications devices via the at least one internal channel, according to some embodiments.

Another implementation of the present disclosure is a drive through system for a restaurant, according to some embodiments. In some embodiments, the drive through system includes multiple drive through units, a headset, and processing circuitry. Each of the multiple drive through units include a speaker and a microphone and positioned at a separate lane, according to some embodiments. The headset is configured to be worn by an order taker of the restaurant, according to some embodiments. The processing circuitry is configured to operate a display screen to notify the order taker regarding a presence of a customer at one of the drive through units. The processing circuitry is also configured to obtain a user input to transition the portable communications device between multiple different channels, according to some embodiments. The multiple different channels correspond to one of the drive through units, according to some embodiments. In some embodiments, the processing circuitry is configured to transition the headset to one of the different channels according to the user input. In some embodiments, the processing circuitry is configured to operate both the headset and the one of the drive through units to exchange audio data over the one of the different channels to implement end-to-end bi-directional audio communication between the order taker and the customer.

In some embodiments, the drive through units include four drive through units. In some embodiments, the different channels include four order taking channels, each of the drive through units configured to communicate on one of the four order taking channels.

In some embodiments, the headset is configured to wirelessly communicate with a unit having a wireless transceiver and wiredly coupled with a first audio input-output communications module of an audio switchboard on which the processing circuitry is implemented. In some embodiments, the audio switchboard further includes a second audio input-output communications module communicably coupled with the drive through units. In some embodiments, the audio switchboard includes an audio router configured to define the different channels to selectively communicably couple the headset with any of the drive through units.

In some embodiments, the headset is a first of multiple headsets. The drive through system further includes multiple point of sale units, according to some embodiments. In some embodiments, display screens of all of the point of sale units are updated to provide a visual indication as to which of the different channels one of the headsets is currently connected, where such an update may optionally be performed substantially at the same time (substantially in unison) among the display screens.

In some embodiments, the point of sale units include touch screen devices. The touch screen devices are configured to both (a) provide a graphical user interface (GUI) to visually indicate which of the drive through units at which a vehicle currently present, and to also visually indicate which of the drive through units at which the vehicle has not yet been served, and (b) receive the user input as a selection of one of the drive through units, according to some embodiments. In some embodiments, the processing circuitry is further configured to obtain sensor data indicative of a presence of a vehicle at one of the drive through units. In some embodiments, the processing circuitry is further configured to operate the display screen to notify the order taker regarding the presence of the vehicle at the one of the drive through units to prompt the order taker to provide the user input. In some embodiments, the display screen is a screen of the point of sale unit, the point of sale unit being configured to receive the user input to initiate the transition of the headset to the one of the different channels.

This summary is illustrative only and is not intended to be limiting. Various aspects, inventive features, and advantages of the systems described herein are set forth in more detail below.

BRIEF DESCRIPTION OF THE DRAWINGS

The disclosure will become more fully understood from the following detailed description, taken in conjunction with the accompanying FIGURES, wherein like reference numerals refer to like elements, in which:

FIG. 9 is a flow diagram of a process for providing and using a drive through system with multiple lanes and communications channels for the multiple lanes, according to some embodiments.

DETAILED DESCRIPTION

Before turning to the FIGURES, which illustrate the exemplary embodiments in detail, it should be understood that the present disclosure is not limited to the details or methodology set forth in the description or illustrated in the FIGURES. It should also be understood that the terminology used herein is for the purpose of description only and should not be regarded as limiting.

OVERVIEW

Referring generally to the FIGURES, a drive through system includes multiple lanes (e.g., four lanes) and corresponding display boards (e.g., having menus, display screens, and microphones and speakers) positioned in each of the multiple lanes. The microphones and speakers may be positioned on a post proximate the display boards (e.g., a separate order unit). The drive through system may include vehicle detection systems such as cameras that are positioned about the lanes and are configured to identify or detect a presence of a vehicle (e.g., a customer) at the display boards. Where the term "customer" is used herein, it should be understood that this may include prospective customers, vehicle occupants, passengers, etc. The drive through system also includes a controller and wearable communications devices that can be worn (or otherwise transported) by order takers of the drive through system. The controller may include audio switching or channel features and may prompt one or more of the order takers to switch their wearable communications devices to a channel corresponding to a display board at which a customer has arrived. The controller may also define one or more internal channels to enable cross-talk between wearable communications devices. Advantageously, the systems and methods described herein with reference to drive through communications systems facilitate management across multiple lanes of vehicles and communication between different display boards.

Drive Through System

Figure 1:
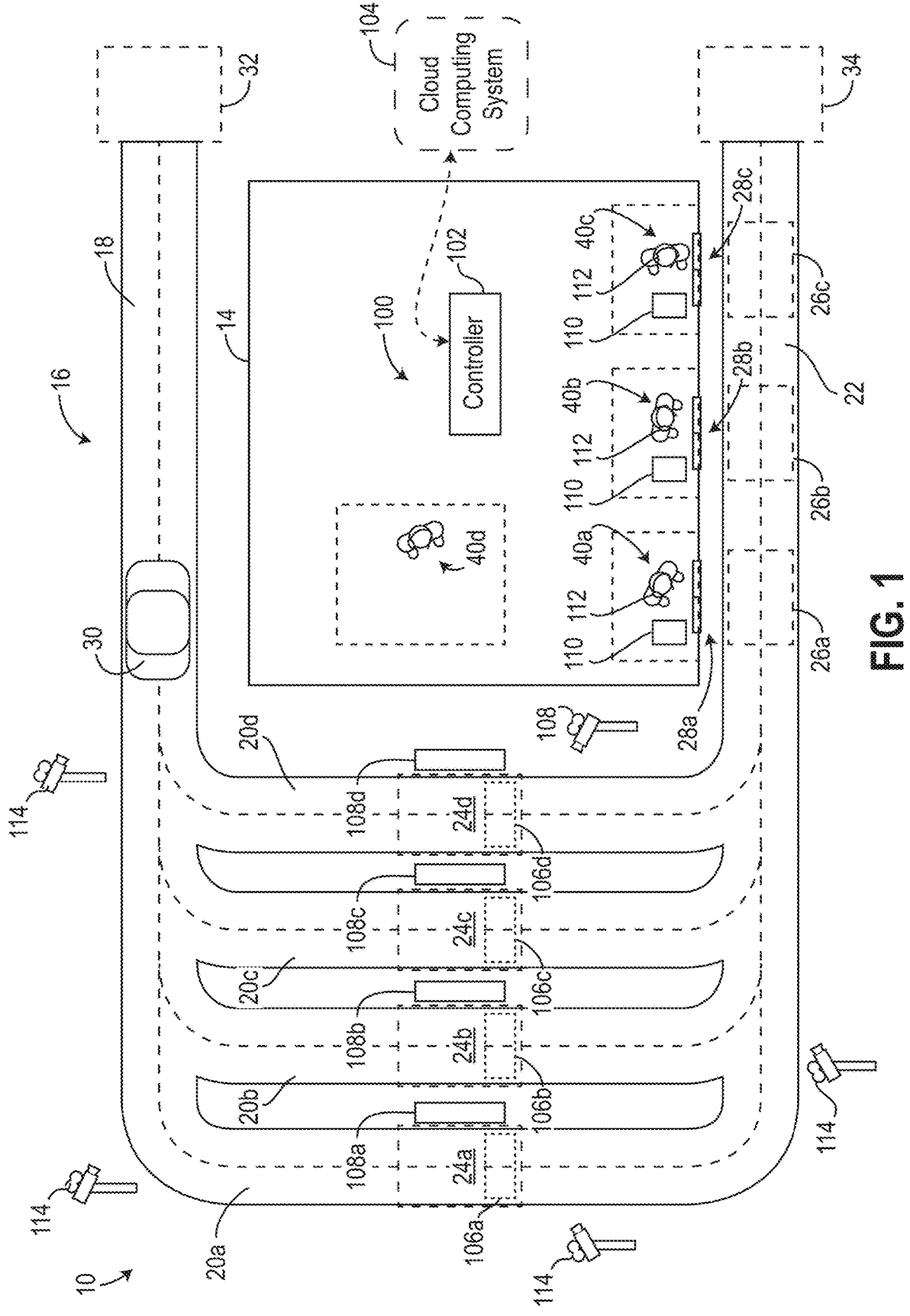
FIG. 1 is a diagram of a drive through system including multiple lanes and a communications system for communicating with customers of the multiple lanes, according to some embodiments.
Figure 2:
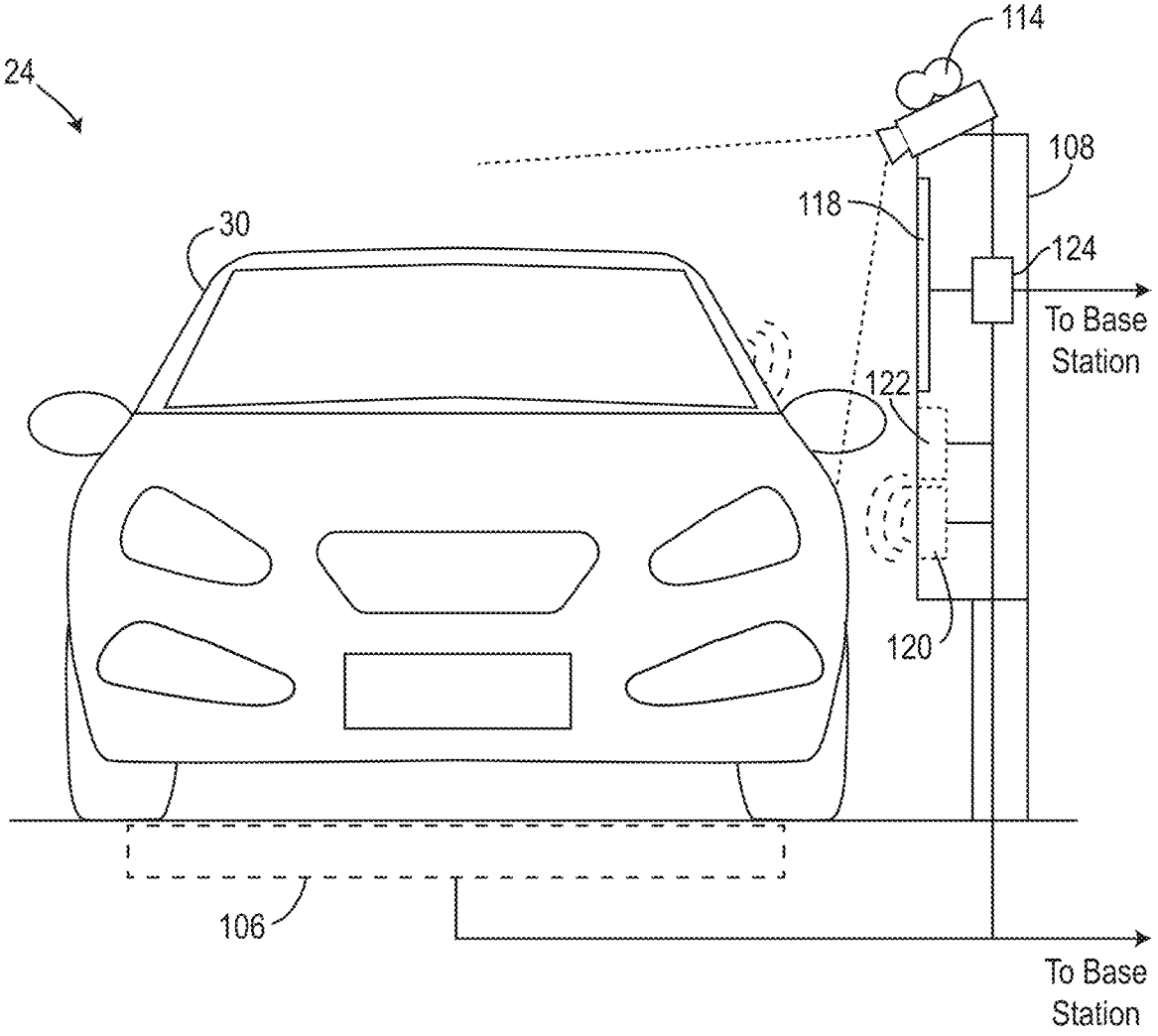
FIG. 2 is a diagram of an order station of the drive through system of FIG. 1 at which a customer may place an order by speaking into a microphone of a drive through unit that is in communications with an order taker of a restaurant, according to some embodiments.

Referring particularly to FIGS. 1-2, a drive through system 10 for a store 14 (e.g., a restaurant, a diner, a fast food restaurant, an establishment, etc.) includes a lane system 16 (e.g., a starting lane, one or more ordering lanes where a point of sale (POS) transaction may be conducted or initiated, ordering lanes where customers may communicate with employees of the store 14, etc.), a starting location 32, and an ending location 34. The starting location 32 may be a zone or area at which one or more customers (e.g., customers in vehicles, shown as vehicle 30) enter the lane system 16. The lane system 16 includes an entry lane 18, a first order lane 20a, a second order lane 20b, a third order lane 20c, a fourth order lane 20d, and a pickup lane 22. The pickup lane 22 (e.g., an exit lane) may extend along a side of the store 14 including one or more pickup windows, shown as first window 28a, second window 28b, and third window 28c such that customers (e.g., vehicles 30) may access the different windows 28 to pick up their orders from the store 14. The term "window" should be interpreted broadly to mean a customer-store interface which is not limited to those with a physical screen or barrier. It should also be understood that while the systems and methods described herein may be applied to four lanes, the systems and methods can be implemented for drive through systems having any number of multiple lanes (e.g., two lanes, three lanes, five lanes, six lanes, etc.).

The starting location 32 and the ending location 34 may define starting and ending points for customers, with the order lanes 20 defining different paths between the starting location 32 and the ending location 34. In some embodiments, each of the order lanes 20 defines a corresponding order zone 24 at which the customer may place an order for pickup at one of the windows 28. In some embodiments, the first lane 20a includes a first order zone 24a, the second lane 20b includes a second order zone 24b, the third lane 20c includes a third order zone 24c, and the fourth lane 20d includes a fourth order zone 24d. Each of the order zones 24 includes a corresponding drive through unit 108 (e.g., a menu board, a kiosk, a field communications unit, an order placement unit at which a customer may place an order, etc.) which facilitates communications between the customer at the order zones 24 and personnel of the store 14, as well a display screen or signage indicating available items for purchase, and order or point of sale information (e.g., a number of items, corresponding cost, total cost, tax, etc., for an ongoing order). In some embodiments, the first order lane 20a includes a first drive through unit 108a, the second order lane 20b includes a second drive through unit 108b, the third order lane 20c includes a third drive through unit 108c, and the fourth order lane 20d includes a fourth drive through unit 108d. In some embodiments, the order lanes 20 define one or more paths that include a series of discrete geometric forms (e.g., polygonal shapes, curvilinear shapes) mapped to different physical locations along the order lanes 20. The series of geometric forms may match between multiple cameras (e.g., imaging devices 110) that have different field of views in order to facilitate awareness, identification, and tracking of vehicles along the one or more paths between the starting location 32 and the ending location 34.

The drive through units 108 are interfaces that may be components of a communications system including at least one point of sale system, shown as communications system 100 of the drive through system 10. In some embodiments, the drive through units 108 are integrated via one or more point of sale systems. The communications system 100 includes the drive through units 108, a controller 102, one or more imaging devices 114 (e.g., cameras) positioned about the lane system 16, a cloud computing system 104, one or more input devices, shown as order taking stations 110, and one or more wearable communications devices 112. In some embodiments, the one or more order taking stations 110 are disposed in each of a corresponding zone within the store 14 proximate the windows 28. The order taking stations 110 may include a touch screen or user interface configured to both display image data (e.g., a graphical user interface, a menu, selectable options for an order or point of sale, etc.), and receive user inputs from a corresponding employee of the store 14 to add items to an order or point of sale. The wearable communications devices 112 may have the form of headphones, earpieces, etc., and can include both speakers (e.g., acoustic transducers, aural output devices, etc.) and microphones (e.g., aural input devices). In some embodiments, the controller 102 is communicably coupled with each of the order taking stations 110 at the windows 28, the imaging devices 114, and the head wearable communications devices 112. The controller 102 may also be communicably coupled with a cloud computing system 104 and can upload or provide various information regarding points of sale to the cloud computing system 104 for analysis. In some embodiments, the controller 102 is configured to receive, from the cloud computing system 104, software or firmware updates for various devices of the communications system 100. In some embodiments, the wearable communications devices 112 may be portable communications devices including but not limited to headphones, earphones, earbuds, devices configured to clip to a belt or article of clothing, ear pieces, etc., any device having at least one of a speaker or microphone and configured to be worn, held, or otherwise move with an individual to establish an end point for audio communications (e.g., produce sound via a speaker and/or receive a sound input via a microphone). It should be understood that the components of the communications system 100 (e.g., the drive through units 108, the controller, the one or more imaging devices 114, the cloud computing system 104, the order taking stations 110, and the wearable communications devices 112) may optionally be integrated with each other via a point of sale (e.g., all such components or a subset of the foregoing components). Integrating the components of the communications system 100 via the point of sale may facilitate improved efficiency of the drive through, for example.

The communications system 100 provides selective communicability according to multiple channels between any of the personnel (e.g., personnel 40a at the first window 28a, personnel 40b at the second window 28b, and personnel 30c at the third window 28c) and customers at one of the order zones (e.g., the first order zone 24a, the second order zone 24b, the third order zone 24c, and the fourth order zone 24d) via the wearable communications devices 112 and the drive through units 108. In some embodiments, each of the drive through units 108 is configured to communicate according to a corresponding channel (e.g., a first order channel, a second order channel, a third order channel, and a fourth order channel) and the personnel at the windows 28 can selectively establish communicability with the customers at the different order lanes 20 by selectively switching between the channels such that the wearable communications devices 112 are communicatively coupled on a selected one of the channels. In some embodiments, the communications system 100 also facilitates private communication between one or more of the personnel 40 within the store 14 or at other remote locations (e.g., a service center). For example, the personnel may include a kitchen personnel 40d that may communicate with any of the personnel 40a, the personnel 40b, or the personnel 40c at the windows 28 via one or more remote channels. In some embodiments, the kitchen personnel 40d may also listen on one or more of the channels on which the customers at the zones 24 can communicate.

Referring particularly to FIG. 2, one of the order zones 24 is shown in greater detail, according to some embodiments. The order zones 24 may include a space or surface of the order lane 20 for the customer, shown as vehicle 30 to pull up and place an order. The order zone 24 may include at least one pressure or force sensor 106. The at least one pressure or force sensor 106 is configured to detect the presence of the vehicle 30 and notify the controller 102 that a customer has arrived to the specific order zone 24 (e.g., pulled up, reversed into, merged into, parked in, etc.). The order zones 24 may also include one or more imaging devices 114 (e.g., cameras, image sensors, sensor arrays) for detecting the presence of the vehicle 30. The drive through units 108 include a display screen 118 configured to display a current order, items in the order, and cost of the order or other aspects of an order property, alone or in any combination. The display screen 118 may be operable by one or more of the personnel 40 who is taking the customer's order. In some embodiments, the order zones 24 may optionally include at least one pressure sensor and/or at least one magnetic ground loop. For example, if the order zones 24 already include a pressure sensor and/or a magnetic ground loop, the controller 102 may communicate with and use feedback from the pressure sensor and/or the magnetic ground loop. In some embodiments, the order zones 24 may lack both a pressure sensor and/or a magnetic ground loop.

The drive through unit 108 may also include a microphone 122 configured to capture audio (e.g., spoken audio) from the customer and transmit data (audio data, audio signals) to the personnel 40 who is taking the customer's order via a corresponding channel of the communications system 100 for the order lane 20 of the order zone 24. In some embodiments, the drive through unit 108 also includes a speaker 120 configured to provide audio data of the voice or spoken words of the personnel 40 obtained by the wearable communication device 112 who is communicating on the channel of the drive through unit 108. In this way, the communications unit 118 may provide a customer end for audio communications and the wearable communications device 112 may provide a personnel end for audio communications between the customer and one of the personnel 40 (e.g., according to an audio or communications channel). In some embodiments, the at least one pressure or force sensor 106, the speaker 120, the microphone 122, the imaging device 114, and the display screen 118 are configured to communicate directly with the controller 102 of the communication system 100. In some embodiments, the pressure or force sensor 106, the speaker 120, the microphone 122, the imaging device 114, and the display screen 118 are configured to communicate with a zone controller 124 that communicates with the controller 102. In some embodiments, the speaker 120 and the microphone 122 are disposed in a separate unit (e.g., a separate housing) positioned proximate the drive through unit 108. The separate unit may have the form of a post including the speaker 120 and microphone 122 positioned within a housing of the post.

Communications System

Figure 3:
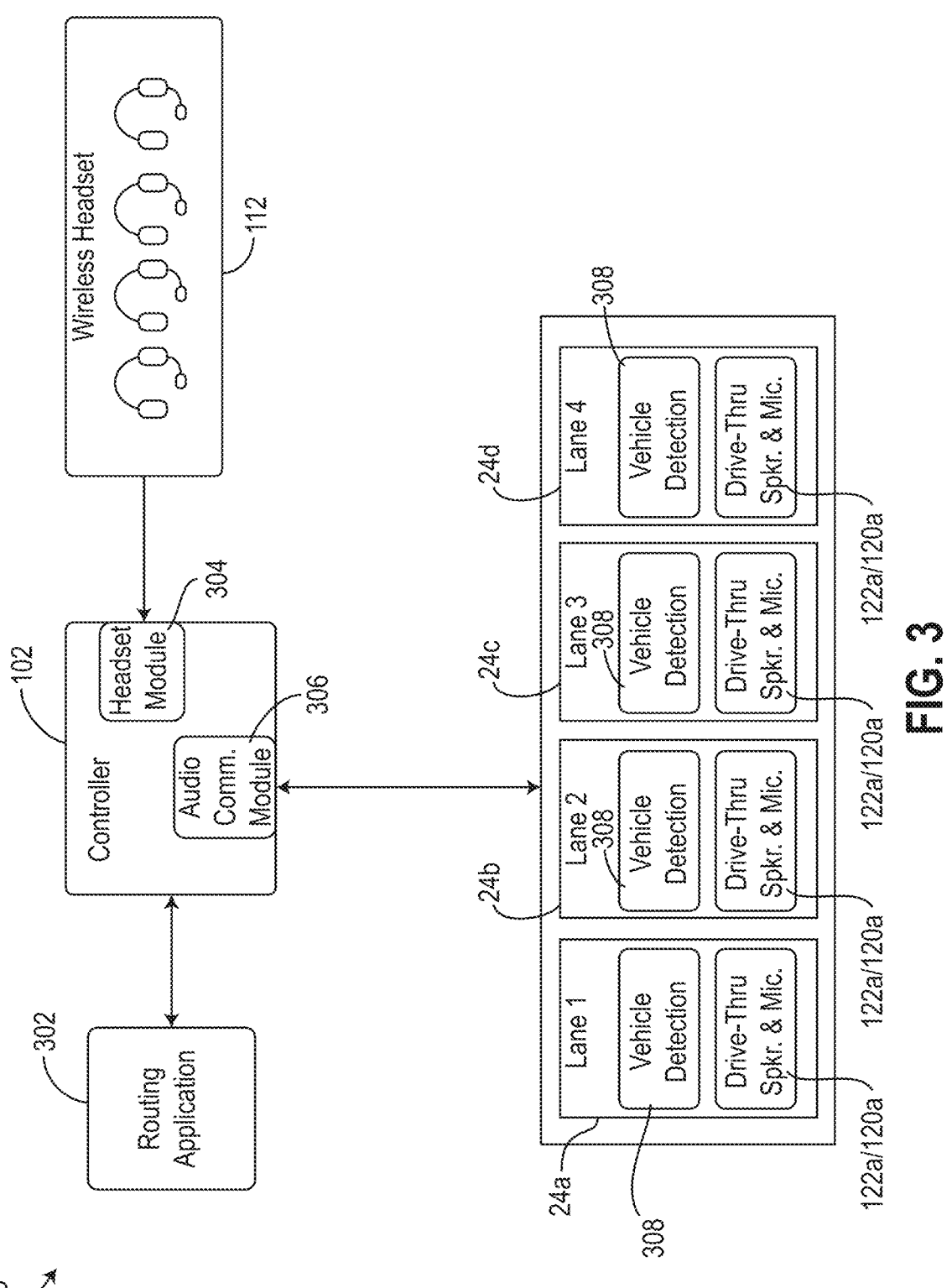
FIG. 3 is a block diagram of the communications system of FIG. 1, according to some embodiments.

Referring to FIG. 3, the communications system 100 include the controller 102 (e.g., a base station), the wearable communications devices 112 (e.g., wearable headsets, wearable headphones, wearable earpieces and microphones, etc.), a point of sale unit 302 (e.g., the order taking stations 110, a tablet, a computer screen, a desk-mounted touchscreen, a computing device, etc.) configured to run a routing application, and the various components of the communications system 100 that are positioned about the lane system 16 (e.g., at the order zones 24). In some embodiments, the communications system 100 includes one or more vehicle detection sensors 308 that are configured to detect the presence or motion of vehicles 30 in each of the different lanes 20. The vehicle detection sensors 308 may include any of the pressure or force sensors 106 or the imaging devices 114 which are configured to detect the presence of vehicles 30 at any of the lanes 20. In some embodiments, the communication system 100 includes the microphones 122 and the speakers 120 of each of the drive through units 108 (e.g., drive through communications units). The controller 102 can include an audio communication module 306 and a headset module 304. The headset module 304 is configured to facilitate communication (e.g., wireless) between one or more of the wearable communications devices 112 and the controller 102. In some embodiments, the wearable communications devices 112 are configured to provide audio data obtained from one of the personnel 40 who is wearing the wearable communications devices 112 via a microphone (e.g., spoken language audio data or signals). The audio communications module 306 can facilitate selectively changing a routing or switching of channels between the four different lanes such that the audio data obtained from the one of the personnel 40 who is wearing the wearable communications devices 112 is relayed or transmitted to a selected one of the drive through units 108.

In some embodiments, each of the wearable communications devices 112 include a speaker and microphone for providing clear communications with customers in the lanes 20a-20d at the drive through units 108. The wearable communications devices 112 may be adjustable to conform to a head of the personnel 40 who is wearing the wearable communications devices 112, and may include active noise-canceling functionality. In some embodiments, each of the wearable communications devices 112 is configured to obtain power from an on-board battery that provides at least 8 hours of lifetime on a single charge. In some embodiments, the wearable communications devices 112 can communicate with the controller 102 (e.g., the base station) wirelessly with at least 30 meters of range. The wearable communications devices 112 may communicate with the controller 102 via Bluetooth, Wi-Fi, radio frequency, etc., or any other wireless communications protocol. In some embodiments, the wearable communications devices 112 include one or more buttons to switch between one or more internal channels defined by the controller 102 such that the personnel 40 that wear the wearable communications devices 112 may communicate directly with each other (e.g., according to one or more private channels). In some embodiments, the wearable communications devices 112 include buttons that, when depressed, cause the wearable communications device 112 to switch between four different drive through channels such that the wearable communications device 112 communicates with customers at the different drive through units 108. The wearable communications devices 112 may also include volume control buttons for adjusting (e.g., increasing or decreasing) volume of audio provided by speakers of the wearable communications devices 112. In some embodiments, volume adjustment of the wearable communications devices 112 is achievable by pressing a button of a display screen (e.g., on the routing application that is run by the point of sale unit 302) such that the controller 102 causes corresponding increase or decrease of the volume of sound output by the speakers of the wearable communications device 112.

Referring still to FIG. 3, the controller 102 (e.g., a base station for the store 14 or one or more of the windows 28) may handle audio routing between the wearable communications devices 112, either internally (e.g., according to one or more internal communication channels) or externally (e.g., between the wearable communications devices 112 and the drive through units 108). In some embodiments, the controller 102 is powered by a continuous power supply and includes one or more backup power supply options in case the power supply fails. In some embodiments, the controller 102 is configured to host and integrate one or more wireless transceivers, antennas, etc., shown as the headset module 304. In some embodiments, the controller 102 is configured to operate the routing application of the point of sale unit 302 or the wearable communications devices 112 to notify personnel 40 visually or aurally responsive to detection of a customer at one of the drive through units 108. In some embodiments, the headset module 304 of the controller 102 is configured to support four or more wearable communications devices 112 simultaneously, and the four drive through units 108. The speakers 120 and microphones 122 of each of the drive through units 108 may be wiredly or wirelessly coupled with the controller 102. In some embodiments, the drive through units 108 include weather proof and vandal resistant enclosures within which the speakers 120 and microphones 122 are positioned.

Referring still to FIG. 3, the routing application implemented by the point of sale unit 302 may be provided on a user interface of an order taking station (e.g., the order taking stations 110) within the restaurant or store 14, a tablet (e.g., for an in-the-field order taker), or on any other user interface that is presented to an employee of the store 14. The routing application implemented on the point of sale unit 302 may include a display screen that illustrates different menu options, a live order (e.g., type and number of items in a current order, itemized cost of the order, and total cost of the order), and selectors for transitioning between different channels. When an employee such as an order taker presses one of the selectors to transition between the different channels, the point of sale unit 302 provides a request or message to the controller 102 such that the controller 102 transitions the corresponding one of the wearable communications devices 112 to communicate according to the selected channel (e.g., to establish communications between the wearable communications device 112 and a corresponding one of the drive through units 108 in order to take an order from a customer at one of the four lanes 20. In some embodiments, the point of sale unit 302 can be updated in real-time responsive to signals from the controller 102 when the controller 102 detects that a customer is waiting at one of the drive through units 108 to place an order. In this way, the routing application and the point of sale unit 302 prompt, facilitate, and also initiate switching of the wearable communications devices 112 between the four channels defined by the audio communications module 306 in order to allow seamless transition between the four lanes 20a-20d for order taking. The routing application of the point of sale unit 302 may provide real-time order queues for each of the four lanes 20a, 20b, 20c, and 20d, and may also provide vehicle presence notifications to the order takers (e.g., the personnel 40a, 40b, and 40c). The routing application may provide a visualization of the real-time order queues and the vehicle presence in each of the four lanes 20a-20d, individually and/or simultaneously with each other and with the queue information, and display the visualization to personnel.

In some embodiments, the routing application of the point of sale unit 302 also includes selectors for one or more private channels. The routing application of the point of sale unit 302 can provide feedback or messages to the controller 102 in response to receiving a selection of one of the selectors for the one or more private channels such that the controller 102 switches the wearable communications device 112 corresponding to the routing application of the point of sale unit 302 to a corresponding one of the private channels (e.g., to communicate with kitchen staff, preparation staff, front desk staff, remote staff, other order taking staff, in-field order takers, etc.). Except as otherwise indicated, the term "staff" should be construed broadly to encompass employees, contractors, managers, temporary personnel, and others. It should be understood that each of the wearable communications devices 112 may include a corresponding routing application of a point of sale unit 302 which may be displayed on a personal computer device such as a tablet or smartphone, the order taking stations 110, a front desk, a cash register, etc. In some embodiments, the routing application of the point of sale unit 302 is compatible with the controller 102 (e.g., the base station of the store 14) such that the routing application of the point of sale unit 302 can easily accommodate different firmware or software updates.

Figure 4:
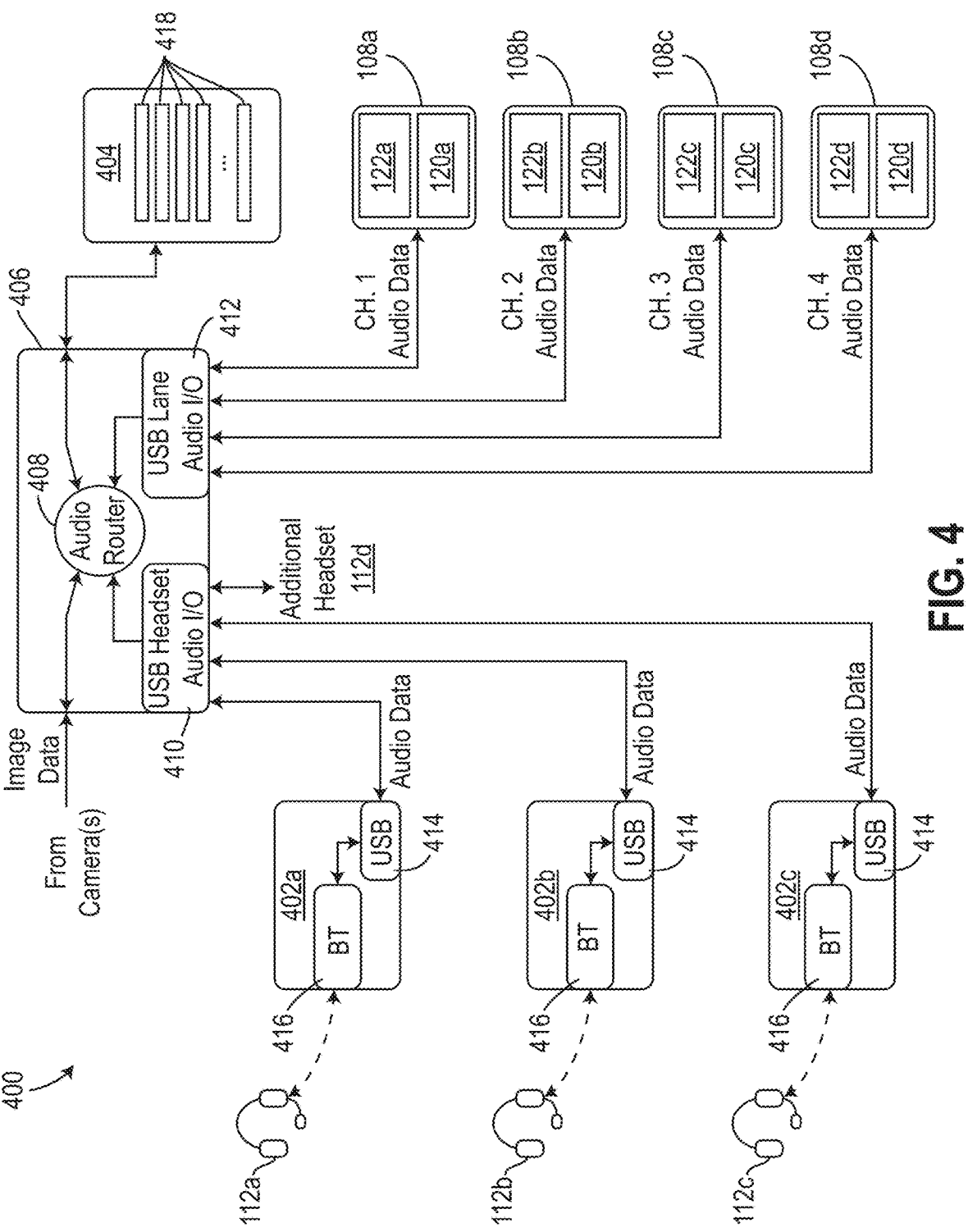
FIG. 4 is a block diagram of the communications system of FIG. 1, according to some embodiments.

Referring to FIG. 4, the communications system 100 is shown implemented as communications system 400 with an audio switchboard 406, according to some embodiments. In some embodiments, any of the functionality of the audio switchboard 406 as described herein is configured to be implemented by the controller 102. The communications system 400 includes the wearable communications devices 112, shown as first wearable communications device 112a, second wearable communications device 112b, and third wearable communications device 112c. The switchboard 406 includes an audio router 408 that is configured to route audio signals, audio data, or audio traffic between the four lanes (e.g., the microphone 122 and speaker 120 of each of the four drive through units 108). In particular, the switchboard 406 is communicably coupled with a first microphone 122a and first speaker 120a of the first drive through unit 108a, a second microphone 122b and second speaker 120b of the second drive through unit 108b, a third microphone 122c and third speaker 120c of the third drive through unit 108c, and a fourth microphone 122d and fourth speaker 120d of the fourth drive through unit 108d.

Each of the drive through units 108 may be communicably or communicatively coupled via one or more wires (e.g., digital communications wires, cables, or cords) with the switchboard 406 at a Universal Serial Bus ("USB") audio input/output ("I/O") module, shown as USB lane audio I/O interface 412 (e.g., a USB communications or data I/O interface). The USB lane audio I/O module 412 is configured to communicate with each of the drive through units 108 according to a separate channel or input such that the audio router 408 can selectively switch between which of the wearable communications devices 112 is configured to exchange audio communications with the drive through units 108. In some embodiments, the audio router 408 is configured to define at least four channels, one for each of the lanes at which a customer may place an order.

Each of the wearable communications devices 112 is configured to communicate with the audio router 408 of the switchboard 406 through a USB headset audio I/O interface 410, according to some embodiments. The USB headset audio I/O interface 410 may be similar to the USB lane audio I/O interface 412 and is configured to receive at least four inputs (e.g., data from four different sources) and provide four outputs (e.g., output digital signals via four outputs). The USB headset audio I/O interface 410 is configured to route traffic or audio signals from one or more of the wearable communications devices 112 to the audio router 408 of the switchboard 406. In some embodiments, each of the wearable communications devices 112 is configured to communicate wirelessly with a corresponding communications unit 402. The communications units 402 may be base devices or wireless transceivers at different windows or locations of the store 14, or may be separate units that are configured to facilitate wireless communications between the wearable communications devices 112 and the switchboard 406. In some embodiments, each of the communications units 402 are provided as standalone communications points, base stations, wireless relays, wireless transceivers, wireless routers, WiFi routers, Bluetooth communications transceivers, etc., that wiredly couple (e.g., via USB) with the USB headset audio I/O interface 410 and wirelessly communicate with a corresponding one or more of the wearable communications devices 112. It should be understood that while the wearable communications devices 112 are described herein using USB communications, the wearable communications devices 112 are not limited to USB communications, and may use any other communications interface or protocol (e.g., Ethernet).

For example, each of the communications units 402 may include a USB interface 414 that is configured to communicate, via a USB cord, with the USB headset audio I/O interface 410, and a Bluetooth ("BT") transceiver 416 that is configured to wirelessly communicate with a corresponding one of the wearable communications devices 112 (e.g., with a Bluetooth transceiver of the corresponding one of the wearable communications devices 112). For example, the first wearable communications device 112a is configured to communicate with the Bluetooth transceiver 416 of a first communications unit 402a, the second wearable communications device 112b is configured to communicate with the Bluetooth transceiver 416 of the second communications unit 402b, and the third wearable communications device 112c is configured to communicate with the Bluetooth transceiver 416 of the third communications unit 402c. In some embodiments, the Bluetooth transceiver 416 of each of the communications units 402 is configured to communicably couple with the USB 414 of the communications unit 402 such that any audio data obtained from the wearable communications devices 112 can be relayed to the audio router 408 of the switchboard 406, and such that audio data provided by the switchboard 406 to the USB interface 414 can be relayed to the wearable communications device 112 via the Bluetooth transceiver 416. In some embodiments, the communications units 402 are each positioned or are a component of a corresponding order taking station 110.

For example, the audio router 408 may define a first lane channel corresponding to audio data obtained from the first drive through unit 108a, a second lane channel corresponding to audio data obtained from the second drive through unit 108b, a third lane channel corresponding to audio data obtained from the third drive through unit 108c, and a fourth lane channel corresponding to audio data obtained from the fourth drive through unit 108d. The audio router 408 is configured to selectively switch one or more of the wearable communications devices 112 to communicate on any of the first lane channel, the second lane channel, the third lane channel, or the fourth lane channel. For example, the audio router 408 can selectively provide end-to-end communications between any one of the drive through units 108 and one of the wearable communications devices 112 in response to selection by an order taker who is wearing the wearable communications device 112. In some embodiments, the communications system 400 includes a button set 404 that includes multiple buttons (e.g., input devices, selectors, etc.), shown as buttons 418. In some embodiments, the communications system 400 includes a button set 404 for each of the order takers (e.g., the personnel 40a, the personnel 40b, and the personnel 40c) such that the order takers can press one of the buttons 418 in order to transition the wearable communications device 112 between different channels. In some embodiments, the button set 404 is provided on a structural portion of the wearable communications devices 112. In some embodiments, the button set 404 is provided on a display screen or a base station at which the order takers initiate a point of sale or complete an order for the customer. The button sets 404 may be provided as physical buttons or as selectable icons of a user interface that is provided on a tablet (e.g., a hand held computing device of an in-field order taker), a front desk display screen, or any of the order taking stations 110.

In some embodiments, the button set 404 is configured to wirelessly or wiredly communicate with the switchboard 406 and the audio router 408 in order to provide a user input indicating a desired selection of one of the audio channels for a corresponding one of the wearable communications device 112. For example, the order taker at the first window 28a may identify (e.g., via visual feedback on a display screen) that a customer has pulled up or arrived at the second drive through unit 108b (e.g., at the second lane 20b) and may press a corresponding one of the buttons 418 in order to switch to the channel (e.g., the second order channel) such that the order taker at the first window 28a can communicate with the customer via the second drive through unit 108b and the first wearable communications device 112a. In some embodiments, the audio router 408 receives the user input from the button set 404 and transitions data communications to/from the first wearable communications device 112a to the second lane channel such that the order taker wearing the first wearable communications device 112a may communicate with the customer via the second drive through unit 108b. It should be understood that any of the wearable communications devices 112 may similarly include a corresponding button set 404 that can selectively transition the corresponding wearable communications device 112 between different channels such that the corresponding wearable communications device 112 can be routed by the audio router 408 to communicate with any of the drive through units 108.

Referring still to FIG. 4, the switchboard 406 can be configured to receive image data or data from one or more of the imaging devices 114, the pressure or force sensor 106, or customer detection data. The switchboard 406 may be configured to provide aural feedback to one or more of the order takers via the wearable communications devices 112 (e.g., via speakers of the wearable communications device 112) in order to prompt the order taker to transition or switch the wearable communications device 112 to the corresponding lane channel of the customer vehicle. In some embodiments, the switchboard 406 is configured to operate a display screen of the button set 404 (e.g., by activating one or more of the buttons 418 if the button set 404 is provided on a display screen or touch screen of the point of sale unit 302 or a touch screen of a base station of one of the order takers, for example, to illuminate the one or more buttons 418) in order to prompt the order taker to transition to the corresponding channel to communicate with the customer to take the customer's order.

Figure 5:
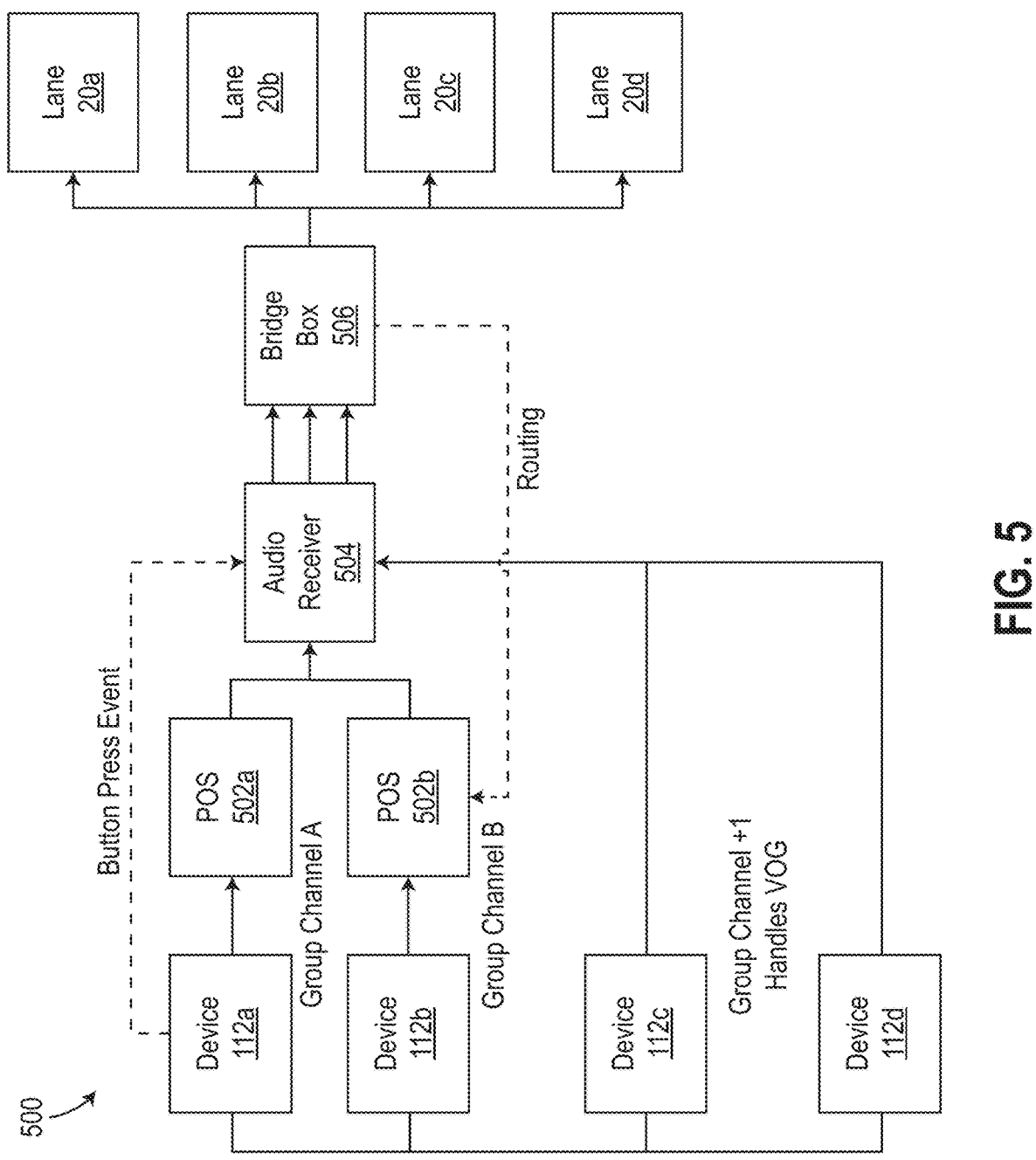
FIG. 5 is a block diagram of the communications system of FIG. 1 including a bridge box, according to some embodiments.

Referring to FIG. 5, the communications system 100 is shown implemented with an audio receiver 504 as communications system 500, according to some embodiments. The communications system 500 includes the wearable communications devices 112a-112d, the audio receiver 504, and a bridge box 506. In some embodiments, the audio receiver 504 includes an array of at least four antennas and is configured to communicate with each of the wearable communications devices 112 directly (e.g., to wirelessly communicate according to a wireless communications protocol). The audio receiver 504 may be configured to define four different channels corresponding to lanes 20a-20d which the wearable communications devices 112 may selectively join in order to establish end-to-end communications (e.g., voice communications) with customers at the lanes 20a-20d. In some embodiments, the audio receiver 504 is also configured to facilitate defining one or more internal or private channels. For example, all of the wearable communications devices 112 may always be tuned in to a private channel over which a manager of the store 14 may communicate to all personnel. In some embodiments, the audio receiver 504 includes a corresponding antenna for each wearable communications device 112 or for each channel such that the audio receiver 504 can communicate with the wearable communications devices 112 and establish communications between the personnel 40 of the store 14 and the drive through units 108 in the four lanes 20.

In some embodiments, the audio receiver 504 is controlled or operated by the bridge box 506. The bridge box 506 may be communicably coupled with each of the drive through units 108 of the lanes 20, the imaging devices 114, etc. In some embodiments, the bridge box 506 is the same as or similar to, and is configured to perform any of the functionality of, the bridge box 135 as described in U.S. application Ser. No. 17/325,871, filed May 20, 2021, now U.S. Pat. No. 11,244,681, the entire disclosure of which is incorporated by reference herein including for the bridge box and components described therein. The bridge box 506 or the audio receiver 504 may control the wearable communications devices 112 to transition between different channels of the audio receiver 504 responsive to button press events of the wearable communications devices 112 or responsive to button press events of button sets 404 corresponding to the wearable communications devices 112. In some embodiments, the bridge box 506 is configured to redirect or switch any of the wearable communications devices 112a-112d and the lanes 20a-20d in order to establish communications between the wearable communications devices 112a-112d and one of the lanes 20a-20d. In some embodiments, the order taking stations 110 or the controller 102 as described herein are configured to perform any of the functionality of the base station 120 as described in greater detail in U.S. application Ser. No. 17/325,871, filed May 20, 2021, now U.S. Pat. No. 11,244,681, the entire disclosure of which is incorporated by reference herein.

In some embodiments, the audio receiver 504 is configured to implement a "voice of authority" ("VOA") functionality such that all of the wearable communications devices 112 may be communicably coupled with an internal channel at all times and are configured to receive audio from a master or control communications device (e.g., worn by a manager of the store 14, the "VOA"). The wearable communications devices 112 may be tuned into the internal channel in a listening-only mode, or may require a particular button press in order to provide responsive audio data or signals to the manager of the store 14 via the internal channel.

In some embodiments, the audio receiver 504 and the bridge box 506 are configured to define one or more internal group channels. In some embodiments, the one or more internal group channels include a kitchen group channel, an all-staff channel, an order-taker channel, etc. It should be understood that while FIGS. 1-5 illustrate four wearable communications devices 112, any of the communications systems may include any number of wearable communications devices 112. For example, each staff of the store 14 may include a corresponding wearable communications device 112 that has access to or is automatically connected on different communications channels (e.g., internal communications channels, one or more of the four channels to communicate with the four lanes 20a-20d) based on a role of the staff. For example, an employee or personnel that works in the kitchen may have access to a kitchen channel such that the employee can communicate with other employees in the kitchen (e.g., two way communications), and also may have access to listen on one or more of the lane channels such that that the employees in the kitchen may hear an order that is being placed by customers. In some embodiments, the audio receiver 504 and the bridge box 506 are configured to enable cross-talk between the wearable communications devices 112 directly, according to private or internal channels or groups, etc.

The audio receiver 504 may include the structure of the communications units 402 as described in greater detail above with reference to FIG. 4 in a single unit that is responsible for establishing wireless communications between the wearable communications devices 112 and the bridge box 506 or the controller 102. In some embodiments, the bridge box 506 is configured to perform any of the functionality of the switchboard 406 as described in greater detail above with reference to FIG. 4. In some embodiments, the bridge box 506 and/or the switchboard 406 are implemented by the controller 102 of the communications system 100.

As shown in FIG. 5, the first wearable communications device 112a may communicate on a first channel, shown as group channel A while the second wearable communications device 112b may communicate on a second channel, shown as group channel B. The bridge box 506 may route audio data to/from any other communications devices that are communicatively on, subscribed to, or switched to, the channel that the wearable communications devices 112 are on. For example, as shown in FIG. 5, the second wearable communications device 112b is subscribed to the group channel B, and accordingly the bridge box 506 is configured to route any audio traffic from other devices (e.g., wearable communications devices 112, drive through units 108, etc.) that are also subscribed to the group channel B to the wearable communications device 112b, or vice versa.

In some embodiments, the first wearable communications device 112a is configured to provide any audio data obtained from the microphone of the first wearable communications device 112a to a first point of sale unit, device, or system 502a, which is communicably coupled with the audio receiver 504. In some embodiments, the first POS system 502a is the order taking station 110 of the first window 28a which implements a first instance of the routing application on a point of sale unit 302. In some embodiments, the first POS system 502a includes an integrated wireless transceiver that is configured to exchange communications with the audio receiver 504. Likewise, the first wearable communications device 112a can also receive any audio data from the first POS system 502a via the communicative connection and operate the speakers of the first wearable communications device 112a to produce sound corresponding to the audio data received. Similarly, the second wearable communications device 112b is communicably coupled with the audio receiver 504 via a second POS system 502b (e.g., the order taking station 110 of the second window 28b). In this way, the audio receiver 504 may be configured to support audio data inputs and outputs via wired connections (e.g., from the first POS system 502a and the second POS system 502b) as well as audio data inputs and outputs via wireless communications (e.g., the third wearable communications device 112c and the fourth wearable communications device 112d).

Figure 6:
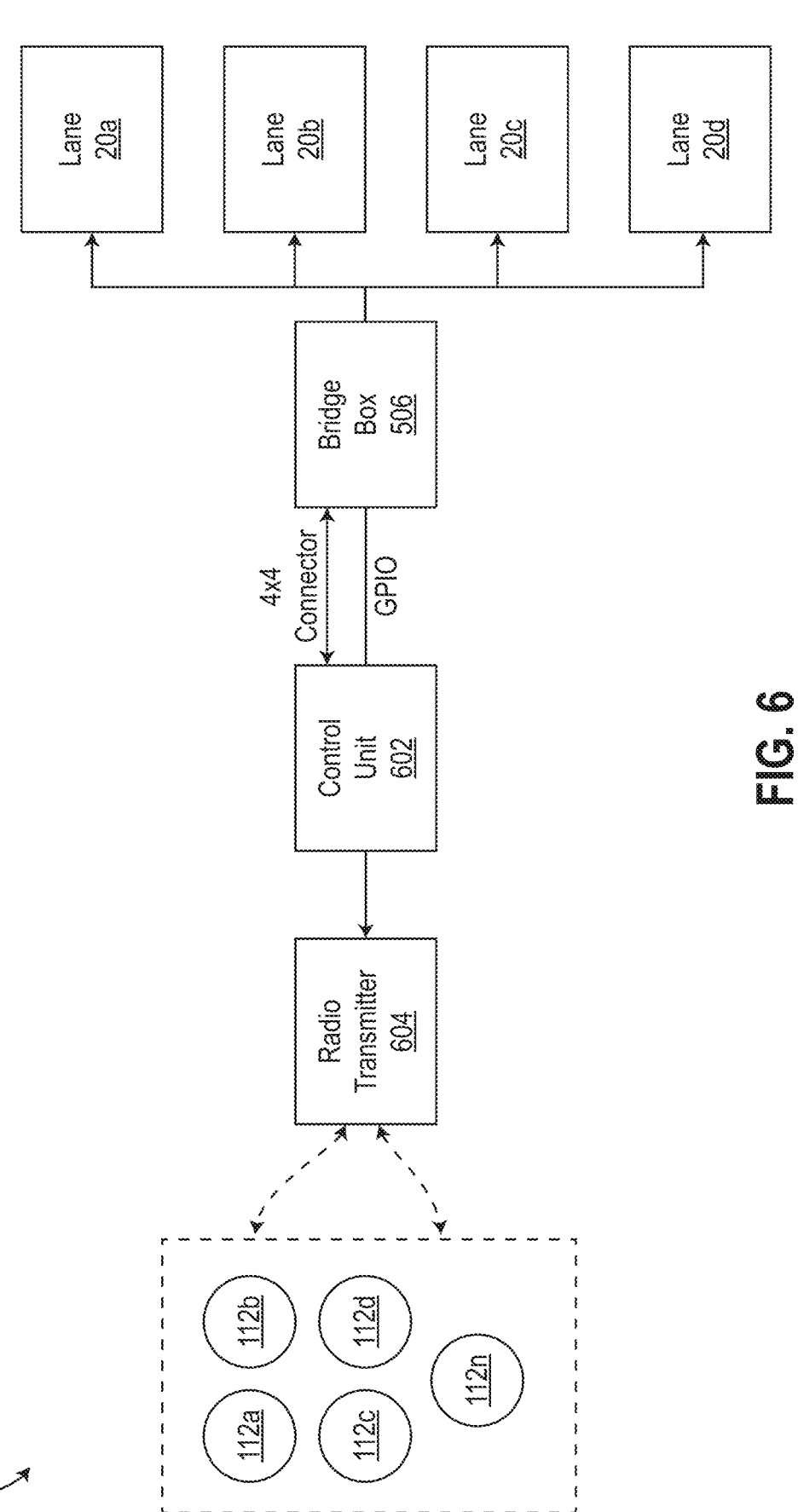
FIG. 6 is a block diagram of the communications system of FIG. 1 including a self-contained control unit, according to some embodiments.

Referring to FIG. 6, the communications system 100, shown as communications system 600, may include a control unit 602 that is configured to control a radio transmitter 604 to establish wireless communications (e.g., Bluetooth, frequency modulation ("FM") radio, etc.) between the control unit 602 and the wearable communications devices 112. As shown in FIG. 6, the communications system 600 may include more than four wearable communications devices 112. Specifically, the communications system 600 can include the four wearable communications devices 112a-112d, etc., and an Nth wearable communications device $112n$, where N is a positive natural number (e.g., 50). The radio transmitter 604 is configured to communicate with each of the wearable communications devices 112 in order to establish communications between the control unit 602 and the wearable communications devices 112.

In some embodiments, the control unit 602 includes a controller for the radio transmitter 604 and is configured to control operation of the radio transmitter 604 (e.g., a single wireless radio or multiple wireless radios) to establish communications between the wearable communications devices 112 and the bridge box 506. In the embodiment, shown in FIG. 6, the functionality of the switchboard 406 and the audio channels are implemented by the control unit 602 which operates the radio transmitter(s) 604 in a manner to establish different lane or order channels and one or more internal channels. In some embodiments, the control unit 602 and the radio transmitter 604 are proprietary retrofit devices that are applicable for other communications systems and are configured for use in a drive-through application. In some embodiments, the control unit 602 and the radio transmitters 604 include a predetermined number of channels that are not managed by the bridge box 506. The bridge box 506 can be communicably coupled with the control unit 602 via a 4×4 connector or wires (e.g., 4 USB connections), and a general purpose input/output ("GPIO") connection. The bridge box 506 can receive audio communications from the drive through units 108 of the lanes 20a-20d and can provide drive through audio from the customers, via the control unit 602 and the radio transmitter 604, to the wearable communications devices 112. Similarly, the bridge box 506 can receive audio responses from the wearable communications devices 112, via the radio transmitter 604 and the control unit 602, and provide drive through feedback (e.g., spoken language by the personnel 40) to appropriate customers via the speakers 120 of the drive through unit 108 on the drive through or lane channel that the wearable communications device 112 is on.

Figure 7:
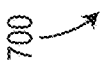
FIG. 7 is a block diagram of the communications system of FIG. 1 retrofit onto existing base stations, according to some embodiments.

Referring to FIG. 7, the communications system 100 may be retrofit onto existing base stations or drive through systems (e.g., field communications units, drive through units, kiosks, sensing systems, base stations, etc.) of a different manufacturer, shown as communications system 700, according to some embodiments. In some embodiments, the communications system 700 includes the cloud computing system 104, one or more of the wearable communications devices 112, a controller 704 (e.g., a bridge box), a first base station 712a that services two different lanes of customer traffic (e.g., lane 1 and lane 2 or lane 20a and lane 20b), and a second base station 712b that services another two lanes of customer traffic (e.g., lane 3 and lane 4 or lane 20c and lane 20d). The first base station 712a may be communicably coupled with the controller 704 via a direct wired connection (e.g., USB) and may receive power from the controller 704 (e.g., from a power board of the controller 704) or from a main power source via a second wired connection, shown as direct current ("DC") 2.1 connector 710a. Similarly, the second base station 712b may be communicably coupled with the controller 704 such that the second base station 712b is configured to exchange data including audio data with the controller 704. In some embodiments, the base station 712b is provided with power via a second DC 2.1 connector 710b and a third DC 2.1 connector 710c.

In some embodiments, the base stations 712a, 712b are pre-existing or legacy base stations of a legacy drive through voice system. The base stations 712 may be pre-existing components and the communications system 100 may be retrofit onto the base stations 712. The first base station 712a and the second base station 712b are configured to control audio signals or data transmission both to and from the drive through units 108, according to some embodiments. In some embodiments, the first base station 712a is configured to connect or communicate with up to two different ones of the drive through units 108 (e.g., two audio channels). Similarly, the second base station 712b may be configured to connect or communicate with up to two different ones of the drive through units 108 (e.g., two channels of audio). In some embodiments, the first base station 712a and the second base station 712b can be configured to communicate with more than two drive through units. In some embodiments, the DC connectors 710 connect to the base stations 712 via a connector on the back of a voice communications circuit board 1118 (shown in FIGS. 12-13C).

In some embodiments, the controller 704 is configured to implement an audio switching application, shown as switching app 706 that defines one or more channels (e.g., four order taking channels and one or more internal channels) and is configured to selectively switch the wearable communications device 112 between the different channels. In some embodiments, the controller 704 is also configured to implement a software development kit ("SDK"), shown as SDK 708 for different order taking and order fulfillment operations. In some embodiments, the controller 704 is configured to communicate (e.g., wiredly via USB communications) with a point of sale unit 702. The point of sale unit 702 may communicate wirelessly with the wearable communications device 112, and may also communicate with the cloud computing system 104 to upload order data for various inventory and tracking purposes. In some embodiments, the controller 704 is configured to receive inputs from a vehicle detector (e.g., the imaging devices 114), a drive through microphone (e.g., the microphones 122 of the drive through units 108), and a drive through speaker (e.g., the speakers 120 of the drive through units 108). The controller 704 may facilitate bi-directional communications between the wearable communications device 112 and one or more drive through units (e.g., the drive through units 108 or units of a pre-existing system). In some embodiments, the controller 704 is configured to prompt the order taker of the wearable communications devices to transition to a different channel to take a customer's order responsive to the vehicle detector. In some embodiments, the wearable communications device 112 is a pre-existing wireless headset for the base station 712a or the base station 712b. The controller 704 may also control operation of a display screen of the point of sale unit 702 according to the SDK 708.

Control System

Figure 8:
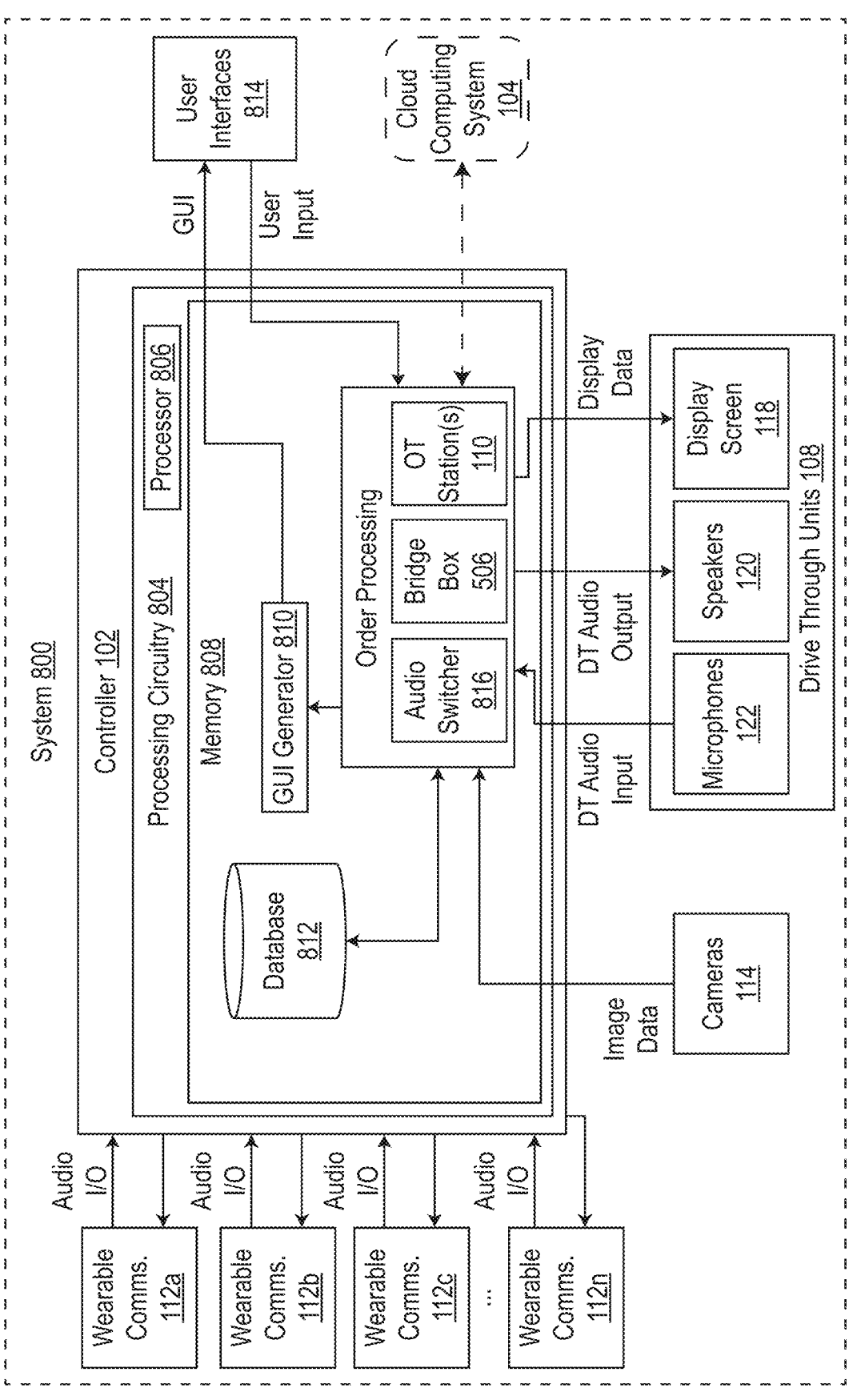
FIG. 8 is a block diagram of an order system and the communications system of FIG. 1, according to some embodiments.

Referring to FIG. 8, the communications system 100 may be provided as a drive through system 800 including the controller 102, the communications units 108, the cloud computing system 104, the wearable communications devices 112, the imaging devices 114, and one or more user interfaces 814, according to some embodiments. In some embodiments, the controller 102 of the system 800 is a single unit or multiple distributed units that are configured to both perform point of sale and order functionality (e.g., verifying purchases, tracking orders, notifying staff of one or more orders that need to be fulfilled) as well as image analysis (e.g., identifying vehicles or customers in the lanes 20a-20d based on the image data obtained by the imaging devices 114), and voice communications (e.g., facilitating communications between one or more personnel 40 and four different lanes 20a-20d of customer traffic).

The controller 102 includes processing circuitry 804, a processor 806, and memory 808. Processing circuitry 804 can be communicably connected to a communications interface such that processing circuitry 804 and the various components thereof can send and receive data via the communications interface. Processor 806 can be implemented as a general purpose processor, an application specific integrated circuit (ASIC), one or more field programmable gate arrays (FPGAs), a group of processing components, or other suitable electronic processing components.

Memory 808 (e.g., memory, memory unit, storage device, etc.) can include one or more devices (e.g., RAM, ROM, Flash memory, hard disk storage, etc.) for storing data and/or computer code for completing or facilitating the various processes, layers and modules described in the present application. Memory 808 can be or include volatile memory or non-volatile memory. Memory 808 can include database components, object code components, script components, or any other type of information structure for supporting the various activities and information structures described in the present application. According to some embodiments, memory 808 is communicably connected to processor 806 via processing circuitry 804 and includes computer code for executing (e.g., by processing circuitry 804 and/or processor 806) one or more processes described herein.

In some embodiments, controller 102 is implemented within a single computer (e.g., one server, one housing, etc.). In various other embodiments controller 102 can be distributed across multiple servers or computers (e.g., that can exist in distributed locations). For example, controller 102 can be made up of multiple controllers or microcontrollers that individually or collectively are configured to carry out operations as described herein.

Referring still to FIG. 8, the controller 102 includes order processing functionality including the bridge box 506 and the order taking stations 110, according to some embodiments. In some embodiments, the controller 102 is configured to implement point of sale initiation or order generation and submission (e.g., the functionality of the order taking stations 110) on the processing circuitry 804 responsive to user inputs from the user interface 814 (e.g., touch screens, tablets, base station user interfaces positioned at the different order taker locations within the store 14 at windows 28*a*, 28*b*, and 28*c*). The controller 102 is configured to obtain data from the user interfaces 814 (e.g., positioned at each order taker station) indicating items to add to each order. In some embodiments, the order taking station 110 of the order processing is configured to provide a submitted order to the database 812 for recordation and tracking once the point of sale initiated by the user interface 814 is submitted. In some embodiments, the order taking station 110 is configured to communicate with the cloud computing system 104 in order to upload point of sale or order data to the cloud computing system 104 for tracking and storage.

The order processing of the controller 102 may also receive remote orders from the cloud computing system 104 and provide notifications to one or more of the user interfaces 814 or to a third party application program interface ("API") such that the order may be prepared by staff of the store 14. In some embodiments, the memory 808 includes a graphical user interface ("GUI") generator 810. The GUI generator 810 is configured to generate a GUI and provide the GUI to one or more of the user interfaces 814. The GUI generator 810 may update the GUI that is displayed on the user interfaces 814 in real-time responsive to detection of a customer based on the image data obtained from the imaging devices 114. For example, if a customer has arrived at one of the drive through units 108, and the bridge box 506 or the order taking station 110 identifies that none of the wearable communications devices 112 have switched to a corresponding channel, the GUI generator 810 may adjust the GUI or operate the user interfaces 814 to notify the order takers (e.g., the personnel 40 that are wearing the wearable communications devices 112) that a customer is waiting to place an order and that one of the order takers should switch to the channel (e.g., the lane or order channel) on which the corresponding drive through unit 108 is communicatively coupled. In some embodiments, the controller 102 may also communicate with or produce a real-time event or API communication system in order to alert other devices (e.g., kitchen alert devices, lighting devices, point of sale devices, etc.) of events or actions occurring at the drive through lanes 20. The events or actions occurring at the drive through lanes include, for example, a vehicle pulling up and waiting for order, an order completed, a vehicle arriving at or departing from a pickup window, etc. The controller 102 may communicate with other types of alert devices as well in order to provide event based alerts. In some embodiments, the controller 102 may use information from the imaging devices 114 to perform pattern recognition and provide an alert when an anomalous event occurs (e.g., an event that is not one of a vehicle arrival or departure, an order completion, etc.).

In some embodiments, the GUI provided to the user interfaces 814 is the same as or similar to any of the GUIs described in greater detail below with reference to FIG. 10A-10E. For example, the GUI displayed by the user interfaces 814 may include a list of icons corresponding to different lane or order channels (e.g., corresponding to each of the drive through units 108) such that the order taker can press the different icons in order to switch the wearable communications devices 112 between the different channels (e.g., to establish end-to-end bi-directional audio communications between one of the wearable communications devices 112 and a corresponding one of the field communications devices 108). In some embodiments, the GUI generator 810 is configured to adjust the GUI that is provided on the user interfaces 814 in order to provide a visual alert that a customer has arrived at one of the drive through units 108 and that none of the order takers have yet switched to the corresponding channel. In some embodiments, the controller 102 (e.g., the order processing functionality, the bridge box 506, the OT stations 110, etc.) is configured to use the image data provided by the cameras 114 to notify the GUI generator 810 that a customer is at one of the drive through units 108 and is waiting to place an order. The GUI generator 810 adjusts the GUI provided on the user interfaces 814 in order to prompt one of the order takers to switch or change to the channel of the drive through unit 108 at which the customer is present to take the customer's order.

Referring still to FIG. 8, the controller 102 is shown communicating with the drive through units 108 and obtaining drive through audio inputs, and outputting drive though output outputs and display data. In some embodiments, the display data is generated by the order processing (e.g., the bridge box 506) or the GUI generator 810 in order to present an itemized list of items in the customer's order in real-time as the order taker adds items to the customer's order via the user interfaces 814 at order taking stations. In some embodiments, the display data is provided to the display screen 118 by the GUI generator 810.

In some embodiments, the order processing includes an audio switcher 816 that is configured to define four lane or order channels and relay audio communications between the wearable communications devices 112 and the communications units 108. In some embodiments, the audio switcher 816 implements any of the functionality of the switching app 706, the control unit 604, the audio receiver 504, the switchboard 406 (e.g., the audio router 408), or the controller 102. In some embodiments, the audio switcher 816 defines a first channel corresponding to the first communications unit 108*a*, a second channel corresponding to the second drive through unit 108*b*, a third channel corresponding to the third drive through unit 108*c*, and a fourth channel corresponding to the fourth drive through unit 108*d*. In some embodiments, the audio switcher 816 is configured to route bi-directional audio traffic (e.g., to/from the microphones 122 and speakers 120 of the drive through units 108 and a selected one of the wearable communications units 112) selectively in response to one of the order takers switching their wearable communications unit 112 to the first channel, the second channel, the third channel, or the fourth channel. For example, when one of the wearable communications devices 112 such as the second wearable communications device 112*b* is transitioned to the second channel, the audio switcher 816 is configured to route audio data traffic between the second wearable communications device 112*b* and the second drive through unit 108*b*.

In some embodiments, the audio switcher 816 is also configured to define one or more internal channels to facilitate cross-talk communications between the wearable communications devices 112. For example, the audio switcher 816 can define internal channels according to employee rank, location, role, etc., and wearable communications devices 112 worn by the employees corresponding to the employee rank, location, role, etc., may be automatically assigned or selectively switch to the appropriate internal channels such that the wearable communications devices 112 on the channels receive all audio traffic transmitted on the internal channel, and can send responsive audio data (e.g., via the microphone of the wearable communications device 112) to all other wearable communications devices 112 on the internal channel.

In some embodiments, the audio switcher 816 also includes or defines a universal channel that all of the wearable communications devices 112 are switched to. In this manner, the wearable communications devices 112 may communicate on or subscribe to audio data traffic on the universal channel (e.g., in a listen-only mode). The universal channel may receive audio inputs from a wearable communications device 112 of a store manager or owner such that the store manager or owner may provide employee-wide announcements on the universal communications channel (e.g., reminding the employees of closing time, etc.).

It should be understood that while the wearable communications devices 112 are shown each providing audio inputs and outputs (e.g., audio data, audio signals, etc.), the wearable communications devices 112 may directly provide the audio inputs and outputs to the controller 102 (e.g., the controller 102 integrates multiple antennas configured to wirelessly communicate with each of the wearable communications devices 112) or may integrate with one or more base stations of the system 800 in order to establish wireless communications with the wearable communications devices 112. In some embodiments, the communications units 108 are directly wired to the controller 102 (e.g., via USB connectors).

Four-Lane Voice Switching Process

Referring to FIG. 9, a flow diagram of a process 900 for providing a drive through having four order taking communications channels (e.g., audio communications channels)

and switching between the four order taking communications channels includes steps 902-916. The process 900 can be performed in order to facilitate improved order taking and reduce wait times and order times for customers in a drive-through (e.g., a drive through restaurant, a fast food restaurant, eatery, dining establishment, entertainment establishment, a drive through store including four order stations and lanes of traffic, etc.). In some embodiments, the process 900 is performed by the system 800 as described in FIG. 8 above, the communications system 700 as described in FIG. 7 above, the communications system 600 as described in FIG. 6 above, the communications system 500 as described in FIG. 5 above, the communications system 400 as described in FIG. 4 above, the communications system 100 as described in FIGS. 1-3 above, or any combination of components, elements, or features of the communications systems described herein. Advantageously, the process 900 facilitates four lanes of ordering traffic and one or more lanes of pickup traffic for customers to expedite and improve a fast food ordering and pickup process.

The process 900 includes providing a drive through system including four lanes (e.g., four order placement lanes), a drive through unit at each lane, a drive through controller, a vehicle detection system, a point of sale unit, and multiple wireless headsets (step 902), according to some embodiments. In some embodiments, the drive through controller is retrofit onto existing drive through units (e.g., ordering stations where the customers may pull up in their vehicles and place an order), base stations, or communications systems. In some embodiments, the drive through units each include at least one speaker and at least one microphone to facilitate bi-directional audio communications between the customer in the vehicle and one or more order takers (e.g., within a building proximate the four lanes) that wear the wireless headsets and initiate an order at the point of sale unit. The drive through system can include any number of wireless headsets including, but not limited to, a number of wireless headsets corresponding to a number of order takers, up to a number of wireless headsets for all personnel of the restaurant or store of the drive through system. In some embodiments, the wireless headsets are configured to wirelessly communicate with one or more base stations or bridge boxes that communicatively couple with the drive through controller.

In some embodiments, the drive through units and the point of sale units are also communicatively or communicably coupled with the drive through controller. The drive through controller may also be communicably coupled with a cloud computing system. In some embodiments, the point of sale unit is communicably coupled with the drive through controller via a wired connection (e.g., a USB or other digital communications protocol cable). In some embodiments, the point of sale unit is communicably coupled with the drive through controller wirelessly (e.g., the point of sale unit may be a tablet or hand held computing device for an in-field or at-lane order taker that wirelessly communicates with the field controller of the drive through system). The drive through controller may be implemented locally within the store or restaurant and can include any number of processors, processing circuits, memory units, etc. In some embodiments, the drive through controller incorporates or communicates with one or more wireless transceivers that are configured to communicate with any wireless devices of the drive through system (e.g., the multiple wireless headsets). The drive through system may be any of, or any combination of, the system 800 as described in FIG. 8 above, the communications system 700 as described in FIG.

7 above, the communications system 600 as described in FIG. 6 above, the communications system 500 as described in FIG. 5 above, the communications system 400 as described in FIG. 4 above, the communications system 100 as described in FIGS. 1-3 above, or any combination of components, elements, or features of the communications systems described herein.

The process 900 includes defining four order taking communications channels, each channel corresponding to one of the drive through units (step 904), according to some embodiments. In some embodiments, the four order taking communications channels are defined by the drive through controller using one or more audio switching techniques. For example, the drive through controller may define one or more network channels for the bi-directional transmission of audio data between end points (e.g., the wireless headsets and the drive through units) and may allow or control switching (e.g., subscribing adjustable or switchable communications devices to different channels) of the wireless headsets between the order taking communications channels. In some embodiments, the drive through units are the drive through units 108 as described in greater detail above with reference to FIGS. 1-2 and are preset to communicate according to corresponding ones of the order taking communications channel. For example, the first drive through unit 108*a* may always communicate on the first order taking channel, the second drive through unit 108*b* may always communicate on the second order taking channel, the third field communication unit 108*c* may always communicate on the third order taking channel, and the fourth drive through unit 108*c* may always communicate on the fourth order taking channel. In some embodiments, a number of order taking channels corresponds to a number of the drive through units 108.

The process 900 includes detecting a vehicle at one of the four lanes proximate a corresponding one of the drive through units (step 906), according to some embodiments. In some embodiments, step 906 is performed by the vehicle detection system of the drive through system such as via cameras, imaging techniques, imaging devices, distance sensors, load or pressure plates in a ground of the lanes proximate the drive through units, etc. In some embodiments, the drive through controller is configured to receive detection data from the vehicle detection system and detect a presence of a customer in a vehicle proximate one of the drive through units.

The process 900 includes operating a display screen of the point of sale unit to notify an order taker regarding the detection of the vehicle and a corresponding one of the order taking communications channels (step 908), according to some embodiments. In some embodiments, step 908 includes operating the display screen to provide an indication of available channels for the order taker's wireless headset and a visual indication or aural indication regarding which of the drive through units and corresponding order channel at which the vehicle is detected. Such an indication (visual and/or audio) may be provided simultaneously or substantially simultaneously across a plurality of the display screens. For example, if the order taker has their wireless headset switched to the first order taking channel, and a vehicle arrives at the second drive through unit in the second lane, step 908 may include operating an icon associated with the second drive through unit and the second order taking channel to increase visual conspicuity of the icon (e.g., highlighting the icon, producing a pulsing or constant glow around the icon, etc.). Step 908 may similarly be performed for the display screen all of point of sale units until one of the order takers switches their headsets to the order taking channel corresponding to the lane or drive through unit at which the vehicle is detected.

The process 900 includes, responsive to an input from the order taker at the point of sale unit or at a button of the wireless headset, switching the wireless headset of the order taker to communicate on the corresponding one of the order taking communications channels (step 910), according to some embodiments. In some embodiments, step 910 is performed responsive to the prompting in step 908 for the order taker to switch their wireless headset to communicate according to the order taking channel corresponding to the lane or drive through unit of the detected vehicle. The input from the order taker can be provided by pressing the icon of the display screen (e.g., a touch screen) that is described in greater detail above with reference to step 908. In other embodiments, a separate button set is provided (e.g., along a side of the display screen of the point of sale unit, on a keyboard or keypad of the point of sale unit, etc.) which may similarly be operated to increase conspicuity of a button for switching to the order taking channel corresponding to the lane or drive through unit at which the vehicle is detected. In some embodiments, the drive through controller receives the input from the point of sale unit or in response to the button press of the wireless headset and switches the wireless headset of the order taker to the order channel as indicated by the button press. Once the order taker has established audio communications with the customer in the vehicle (e.g., via the end-to-end communications established via the order taking channel corresponding to the drive through unit at which the customer has pulled up), the order taker may take the customer's order.

The process 900 includes receiving an order from the point of sale unit at the drive through controller and placing the order (step 912), according to some embodiments. In some embodiments, the point of sale unit is configured to provide order details to the drive through controller and the drive through controller provides the order details to appropriate staff of the restaurant for preparation and handling of the order. In some embodiments, step 912 is performed in response to the order taker pressing a button to complete the customer's order (e.g., on the point of sale unit).

The process 900 includes defining at least one internal channel for cross-talk communications between the multiple wireless headsets (step 914), according to some embodiments. In some embodiments, the internal channel is for communications between order takers that wear the wireless headsets. In some embodiments, the internal channels include channels corresponding to roles of employees or zones of the store or restaurant. For example, the internal channels may include a kitchen or preparation channel for employees tasked with preparing and fulfilling orders placed by customers, a manager channel for managers, an outdoor channel for in-field employees, a pickup channel for pickup orders and employees associated with fulfilling pickup orders, etc. In some embodiments, all of the wireless headsets are also communicatively coupled on a universal channel in a listen-only mode such that a site manager may initiate a VOA announcement to all the employees of the restaurant, store, or establishment.

The process 900 includes, responsive to an input from the order taker at the point of sale unit or at a button of the wireless headset, switching the wireless headset of the order taker to communicate according to one of the at least one internal channels (step 916), according to some embodiments. In some embodiments, step 916 is performed similarly to step 910 but for switching between internal channels.

Figure 14:
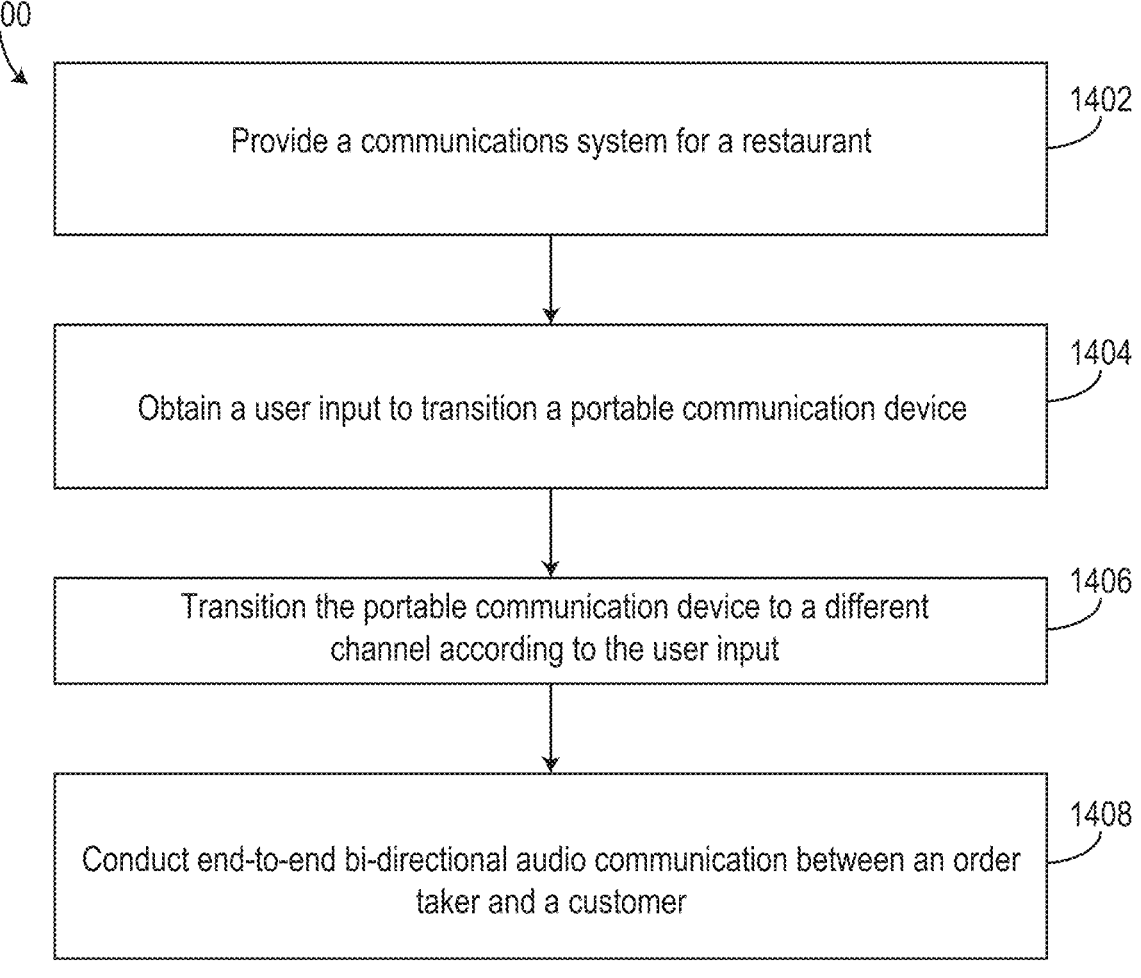
FIG. 14 is a flow diagram of a process for providing and using a communications system for multiple order locations, according to some embodiments.

Referring to FIG. 14, a process 1400 for providing and using a communications system for multiple order locations includes steps 1402-1408, according to some embodiments. The process 1400 can be performed in order to facilitate multiple order taking communications channels (e.g., bi-directional audio communications channels) and switching between the order taking communications channels for a store, restaurant, or other location (e.g., a call center, a central franchisor office, a data center, etc.). In some embodiments, the process 1400 is performed by the system 800 as described in FIG. 8 above, the communications system 700 as described in FIG. 7 above, the communications system 600 as described in FIG. 6 above, the communications system 500 as described in FIG. 5 above, the communications system 400 as described in FIG. 4 above, the communications system 100 as described in FIGS. 1-3 above, or any combination of components, elements, or features of the communications systems described herein.

The process 1400 includes providing a communications system for a restaurant including multiple order locations, a field communications unit at each order location, a controller, a vehicle detection system, a point of sale unit, and a portable communications device (step 1402), according to some embodiments. In some embodiments, step 1402 is similar to step 902 of the process 900. Step 1402 may include providing a communications system for a drive through or drive in restaurant, or any other point of sale location that has multiple locations at which customers may place an order for a product, service, etc., from their vehicles. In some embodiments, the processes described herein can be utilized in other contexts where goods and/or services are provided to customers, e.g., drive-in theaters or other entertainment venues.

The process 1400 includes obtaining a user input to transition the portable communications device between different channels, the channels each corresponding to one of the field communications units (step 1404), according to some embodiments. In some embodiments, the user input is obtained at the point of sale unit and is provided by an order taker. In some embodiments, step 1404 is performed by the controller (e.g., the controller 102). The user input may be provided in response to providing a notification to the order taker to prompt the order taker to provide the user input.

The process 1400 includes transitioning the portable communications device to one of the different channels according to the user input (step 1406), according to some embodiments. In some embodiments, step 1406 is the same as or similar to step 910 of process 900.

The process 1400 includes conducting end-to-end bi-directional audio communication between an order taker and another party (e.g., a customer) by operating the portable communications device and one of the field communications units to exchange audio data over one of the channels (step 1408), according to some embodiments. In some embodiments, step 1408 is the same as or similar to step 910 and includes exchanging audio signals between the field communications device and the portable communications device such that the order taker, and a customer in a vehicle at the order location can communicate with each other (e.g., via voice) in order to place an order.

Figure 15:
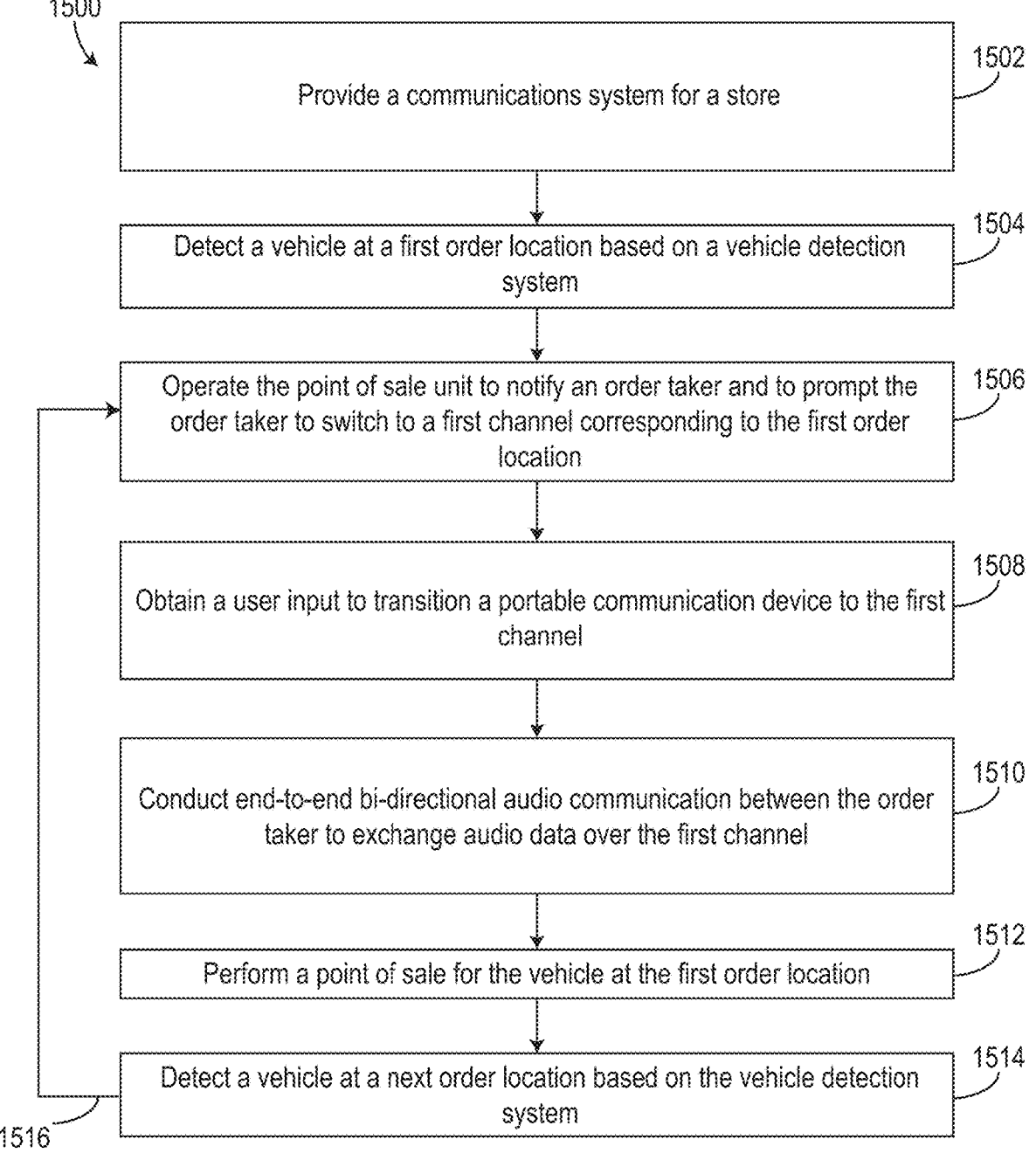
FIG. 15 is a flow diagram of a process for providing a using a communications system for multiple order locations, according to some embodiments.

Referring to FIG. 15, a process 1500 for providing and using a communications system for multiple order locations includes steps 1502-1516, according to some embodiments. The process 1500 can be performed in order to facilitate multiple order taking communications channels (e.g., bi-directional audio communications channels) and switching between the order taking communications channels for a store, restaurant, or other location (e.g., a call center, a centralized franchisor office, a data center, etc.). In some embodiments, the process 1500 is performed by the system 800 as described in FIG. 8 above, the communications system 700 as described in FIG. 7 above, the communications system 600 as described in FIG. 6 above, the communications system 500 as described in FIG. 5 above, the communications system 400 as described in FIG. 4 above, the communications system 100 as described in FIGS. 1-3 above, or any combination of components, elements, or features of the communications systems described herein.

The process 1500 includes providing a communications system for a store including a plurality of order locations, a field communications unit at each order location, a controller, a vehicle detection system, a point of sale unit, and a portable communications device (step 1502), according to some embodiments. In some embodiments, the step 1502 is the same as or similar to step 1402 or step 902. For example, the vehicle detection system may include multiple cameras, imaging devices, force sensors, etc., that are configured to identify or detect the presence of a vehicle at any of the order locations, or to track the location of the vehicle along a route to one of the order locations. The point of sale unit may be a tablet or computer device communicably coupled with the controller. The controller may be communicably coupled with the vehicle detection system, the portable communications device, the point of sale unit, and the field communications unit such that the controller can integrate detection of arriving vehicles, communications between the field communications units and the portable communications device, and point of sale functionality at the point of sale unit.

The process 1500 includes detecting a vehicle at a first of the order locations based on feedback from the vehicle detection system (step 1504), according to some embodiments. In some embodiments, the controller is configured to obtain feedback from the vehicle detection system and use imaging analysis in order to detect the presence of the vehicle at a first of the order locations. In some embodiments, step 1504 is performed by the controller 102.

The process 1500 includes operating the point of sale unit to notify an order taker regarding the vehicle detected at the first order location and to prompt the order taker to switch to a first channel corresponding to the first of the order locations (step 1506), according to some embodiments. In some embodiments, step 1506 includes operating a display screen in order to increase conspicuity of an icon that, when selected, causes the portable communications device to switch to the first channel corresponding to the first of the order locations. In some embodiments, step 1506 is performed by the controller 102 and the user interfaces 814.

The process 1500 includes obtaining a user input to transition the portable communications device between multiple different channels to the first channel, the channels each corresponding to one of the field communications units (step 1508), according to some embodiments. In some embodiments, step 1508 is performed in response to the order taker pressing a button of a user interface, display screen, the point of sale unit, a button set, etc., in response to being prompted to switch channels at step 1506. In some embodiments, step 1508 is performed by the controller 102 responsive to receiving a user input from the order taker.

The process 1500 includes conducting end-to-end bi-directional audio communication between the order taker and the vehicle by operating the portable communications device and one of the field communications units to exchange audio data over the first channel (step 1510), according to some embodiments. In some embodiments, step 1510 is the same as or similar to step 1408 of process 1400.

The process 1500 includes performing a point of sale for the vehicle at the first order location (step 1512), according to some embodiments. In some embodiments, step 1512 is performed by receiving inputs from the order taker at the point of sale unit while performing step 1510 such that the order taker can communicate with the customer at the vehicle at the first order location. In some embodiments, step 1512 is performed by the point of sale unit or by controller 102.

The process 1500 includes detecting a vehicle at a second of the order locations based on the feedback from the vehicle detection systems (step 1514) and performing steps 1506-1510 for the vehicle at the second of the order locations to place an order for the vehicle at the second order location (step 1516), according to some embodiments. Steps 1514 and 1516 may be performed by repeating steps 1504-1512 for a different customer at a different location (e.g., switching the portable communications device to a channel corresponding to the different location and placing an order for the customer).

Graphical User Interfaces

Figure 10A:
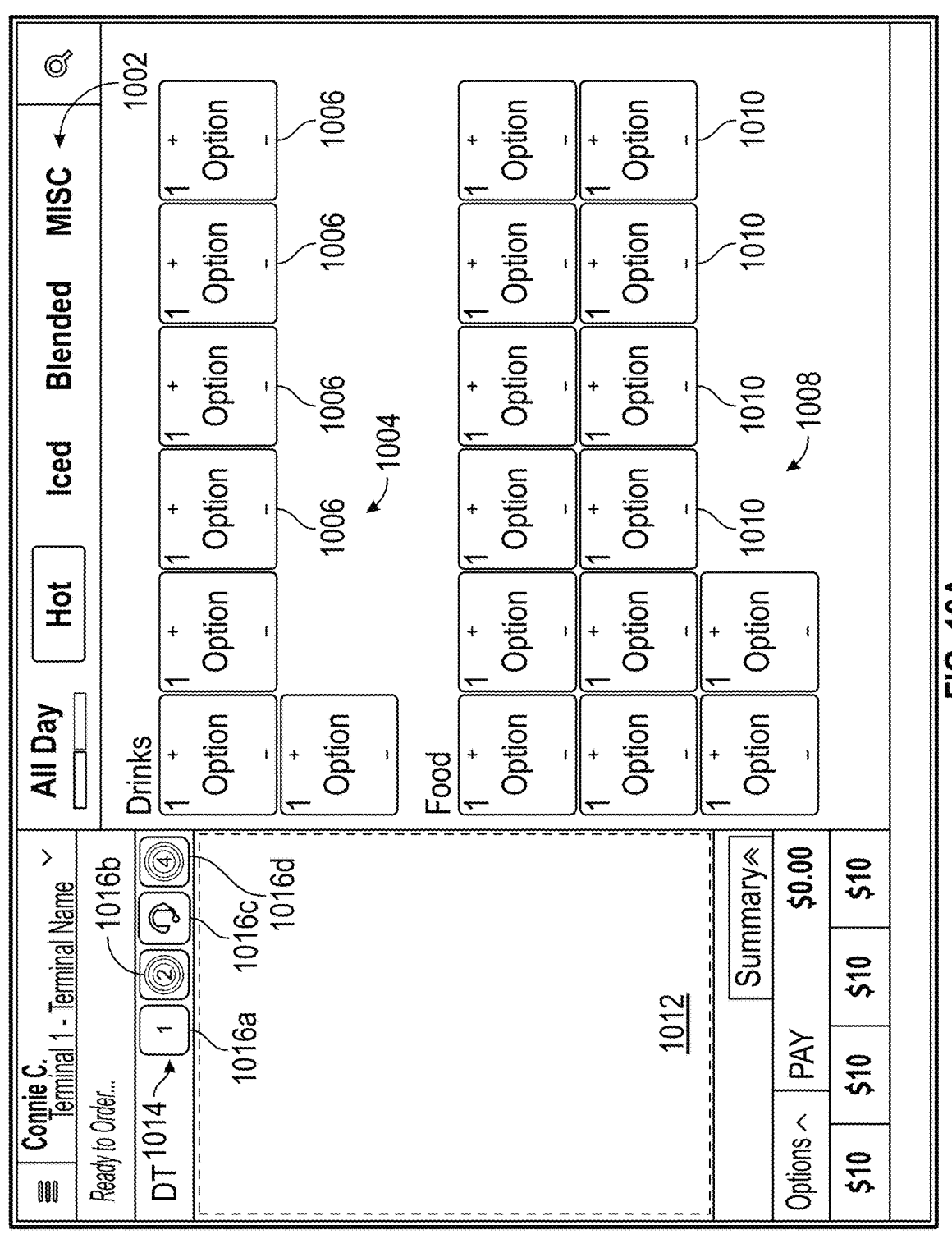
FIG. 10A is a diagram of a user interface presented to an order taker of the drive through system of FIG. 1 on a point of sale unit, according to some embodiments.

Referring to FIG. 10A, a GUI 1000 may be provided to an order taker on a display screen of a tablet (e.g., for an in-field order taker or line buster), a display screen of the order taking stations 110, a front desk or order taking station, etc., or more generally on a point of sale unit. In some embodiments the GUI 1000 different menu icons 1002 (e.g., hot, iced, blended, miscellaneous, lunch menu, breakfast menu, dinner menu, specials, etc.), and order option icons for drinks 1004 and food 1008 corresponding to different items that can be added to the order (e.g., in various quantities). In some embodiments, the drink icons 1004 include multiple selectable icons 1006 that can be pressed to increase or decrease a number of particular drink items for the order. Similarly, the food icons 1008 can include multiple selectable icons 1010 that can be pressed (e.g., by the order taker) to increase or decrease a number of particular food items for the order.

The GUI 1000 also includes an order queue or list 1012 that lists items and number of each items in the order, as well as itemized cost for each item and number of items. In some embodiments, the GUI 1000 includes a total cost (e.g., in a currency such as US dollars) including tax and/or tips. In some embodiments, a GUI similar to the GUI 1000 may be displayed to a customer in real-time as the customer places their order so that the customer can view (e.g., on the display screen 118 of the drive through unit 108) a total cost of the order (e.g., including any tax and gratuity), as well as items that have been added to the order, among other order information.

The GUI 1000 includes multiple channel switching icons 1014 that illustrate available channels for the order taker who is viewing the GUI 1000 as well as which of the channels on which the order taker is currently communicating, according to some embodiments. As shown in FIG. 10A, the GUI 1000 includes a first channel icon 1016a, a second channel icon 1016b, a third channel icon 1016c, and a fourth channel icon 1016d. The first channel icon 1016a corresponds to a channel (e.g., a first order taking or lane channel) on which the first drive through unit 108a (e.g., the first lane 20a) is communicating. Similarly, the second channel icon 1016b corresponds to the channel (e.g., the second order taking or lane channel) on which the second drive through unit 108b is communicating, the third channel icon 1016c corresponds to the channel (e.g., the third order taking or lane channel) on which the third drive through unit 108c is communicating, and the fourth channel icon 1016d corresponds to the channel (e.g., the fourth order taking or lane channel) on which the fourth drive through unit 108d is communicating. In some embodiments, selection of the icons 1016 causes the controller 102 to switch the wearable communications device 112 to the channel corresponding to the selection. It should be understood that the icons 1016 can alternatively or additionally be provided as physical buttons disposed on a side of the wearable communications device 112 or on a physical button set that can be physically pressed by the order taker wearing the wearable communications device 112.

Referring still to FIG. 10A, the channel icons 1016 may be adjusted in display to increase visual conspicuity responsive to detection of a vehicle at the corresponding drive through unit 108 in order to thereby notify the order taker that a customer is waiting to place an order at one of the drive through units 108. In some embodiments, the channel icons 1016 are adjusted in display to increase visual conspicuity in response to both a vehicle being detected at a corresponding drive through unit 108 and in response to none of the wearable communications devices 112 being communicatively coupled on the corresponding channel at which the vehicle is detected. For example, if a vehicle arrives at the drive through unit 108b, corresponding to the second lane or order taking channel, and none of the order takers have switched their wearable communications devices 112 to the second lane or order taking channel, the second channel icon 1016b may be operated to increase visual conspicuity to thereby notify the order takers that a customer is waiting to place an order at the second drive through unit 108b (e.g., at the second lane). In some embodiments, the visual conspicuity of the channel icons 1016 may be achieved by producing a green glow around the channel icons 1016, a pulsing glow, a blinking color, an additional symbol, etc. Once an order taker has switched their wearable communications device 112 to communicate on the corresponding channel, the visual conspicuity of the channel icon 1016 may be decreased (e.g., the green glow ceases).

In some embodiments, the GUI 1000 also notifies the order taker regarding which channel the order taker is currently communicating on via the order taker's wearable communications device 112. For example, as shown in FIG. 10A, the third channel icon 1016c is colored blue and includes a visual representation of a headset, thereby indicating that the order taker of the GUI 1000 is communicating on the third lane or order taking channel. In some embodiments, the visual representation can be provided otherwise via the GUI 1000 such as by highlighting the channel icon 1016, adding an additional icon over the channel icon 1016, etc.

Figure 10B:
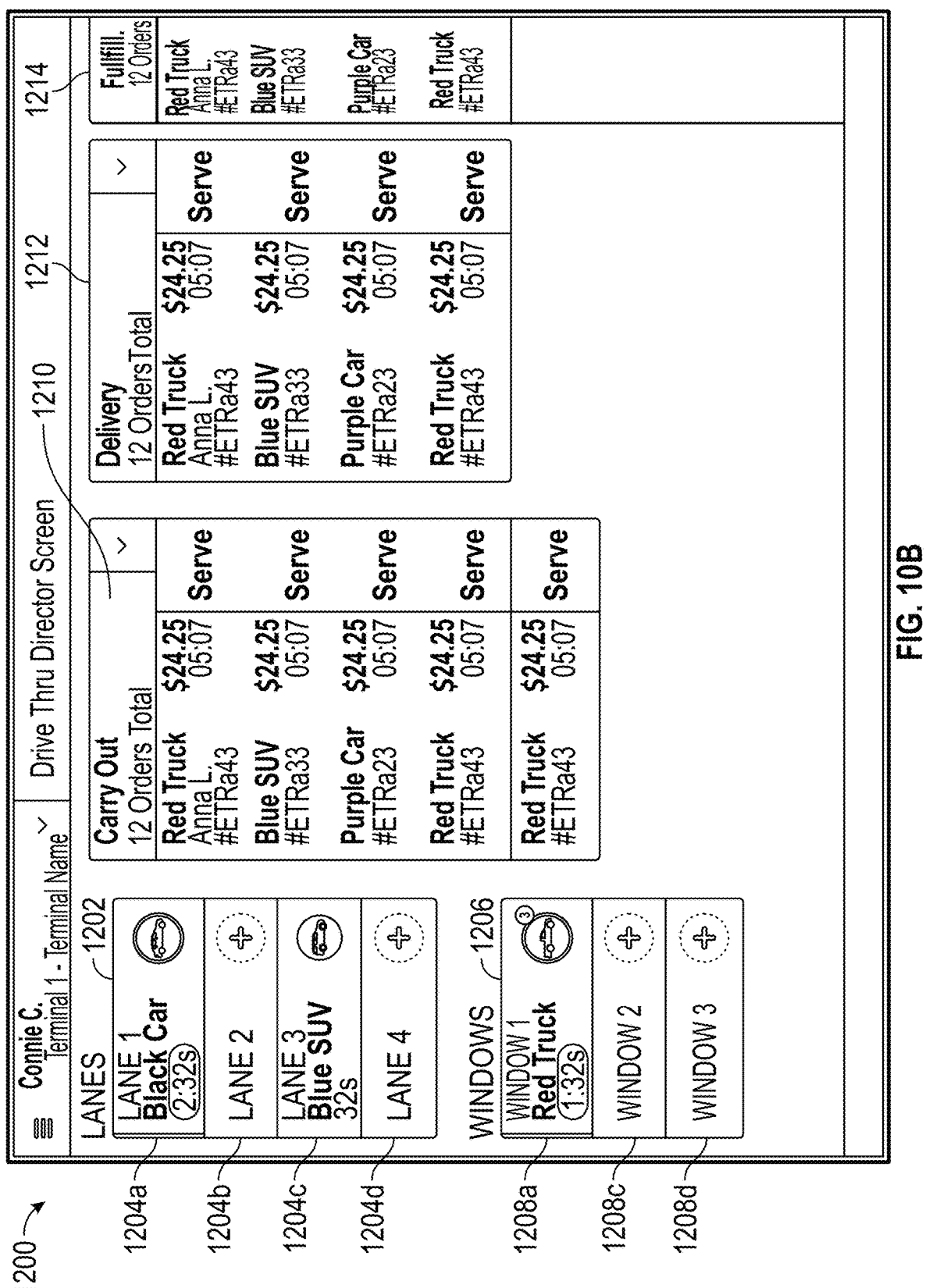
FIG. 10B is a diagram of another user interface presented to an order taker of the drive through system of FIG. 1 on a point of sale unit, according to some embodiments.

Referring to FIG. 10B, a GUI 1200 may be provided to an order taker on a display screen of a tablet (e.g., for an in-field order taker or line buster), a display screen of the order taking stations 110, a front desk or order taking station, etc., or more generally, on a point of sale unit. The GUI 1200 includes a lane window 1202 (e.g., a pane, a module, a widget, etc.) that indicates the four different lane or order taking audio channels selectable via icons 1204a-1204d. Each of the icons 1204 also includes a corresponding icon indicating an icon that includes information of a vehicle at one of the corresponding drive through units 108 including an identification of a type of vehicle and a color of the vehicle (e.g., "black car," "red truck," "blue minivan," "turquoise slingshot," etc., including, e.g., a vehicle make and model). In some embodiments, selection of the icons 1204a-1204d causes the drive through controller 102 to switch the corresponding wearable communications device 112 to switch to the audio, drive though, or order taking channel such that the wearable communications device 112 can facilitate bi-directional audio communications between the order taker and the customer via the drive though device 108.

In some embodiments, the GUI 1200 also includes a carry out window 1210 (e.g., a pane, a module, a widget, etc.) that indicates one or more carry out orders for different customers. The carry out window 1210 may display identifying information including but not limited to license plate numbers, names of customers, time of arrival or check in, type of vehicle, color of vehicle, etc., in order to aid a carry out employee to identify and deliver the customer's order. The carry out window 1210 may also include order information for each order (e.g., total cost, tax, items in the order, itemized costs, etc.), one or more of which may be displayed textually on the carry out window 1210. In some embodiments, the carry out window 1210 includes corresponding icons and textual display of the identifying information and a selectable icon to "serve" the customer. Once the customer has been served, the corresponding icon and identifying information (e.g., a row in a table of icons or carry out orders) may be cleared (e.g., the order has been fulfilled). Once the carry out order has been fulfilled, the fulfilled carry out may be moved to a fulfilled order window 1214 (e.g., a pane, a module, a widget, etc.).

The GUI 1200 also includes a delivery driver order window 1212 (e.g., a pane, a module, a widget, etc.) that is similar to the carry out window 1210 (e.g., including a list of orders, identifying information, etc.). Similar to the carry out window 1210, the delivery driver order window 1212 may include options to "serve" the delivery drivers, and once the orders have been fulfilled, the fulfilled orders may be moved to the fulfilled order window 1214.

Referring still to FIG. 10B, the GUI 1200 may include a pickup windows window 1206 that includes panes 1208a-1208c indicating which customer has arrived at the window. For example, the pane 1208a indicates that a red truck has arrived at the first window 28a who is currently being served.

Figure 10C:
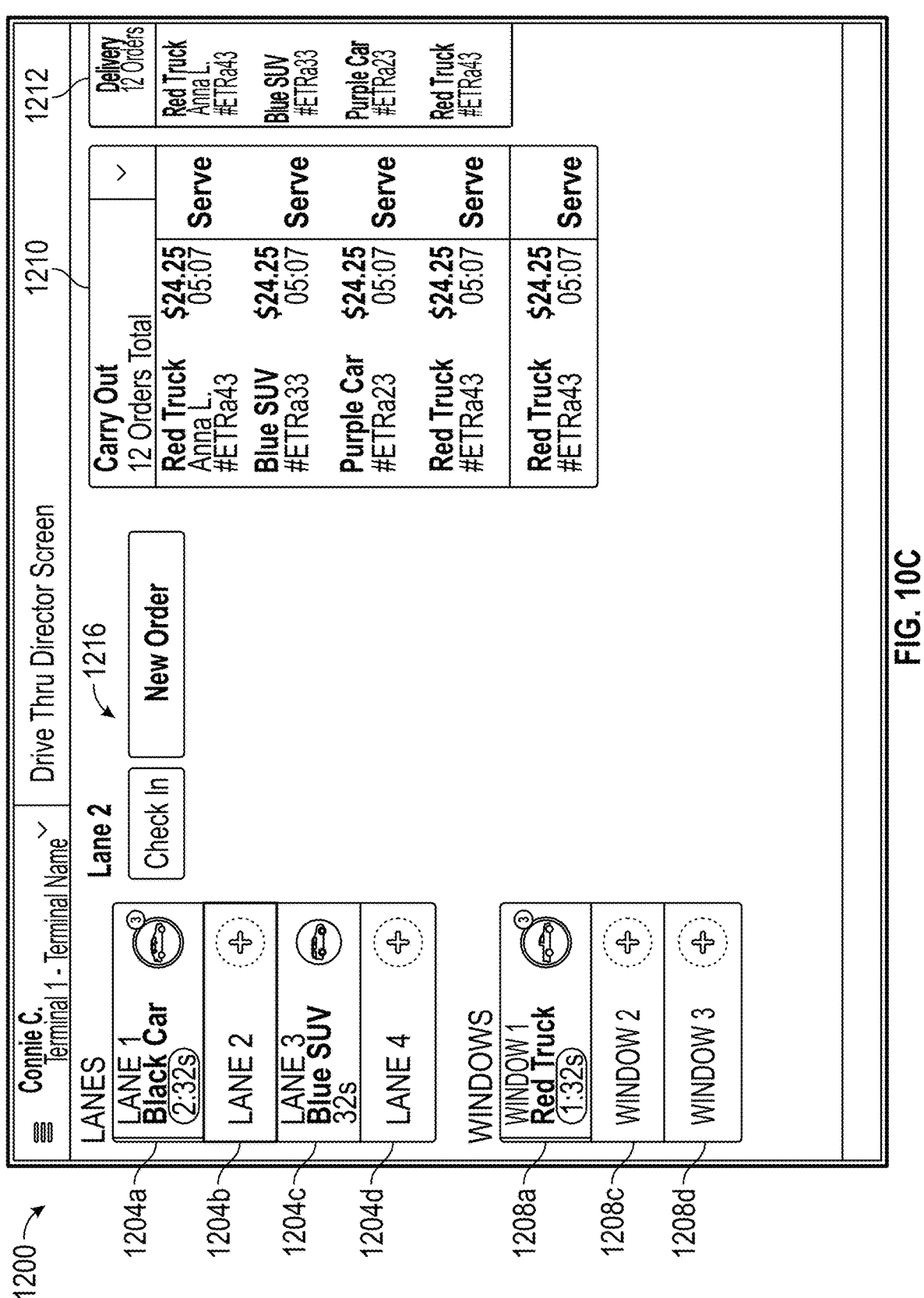
FIG. 10C is a diagram of another user interface presented to an order taker of the drive through system of FIG. 1 on a point of sale unit, according to some embodiments.

Referring to FIG. 10C, when the order taker presses one of the icons 1204a-1204d corresponding to the different lanes 20a-20d and establishes communications with the corresponding drive through unit 108, the GUI 1200 may populate or present a new order window 1216 (e.g., a pane, a module, a widget, etc.) in order to either check in the customer (e.g., if the customer has placed an online order), or to initiate a new order. For example, FIG. 10C illustrates a check in button and a new order button for a customer at the second lane 20b.

Figure 10D:
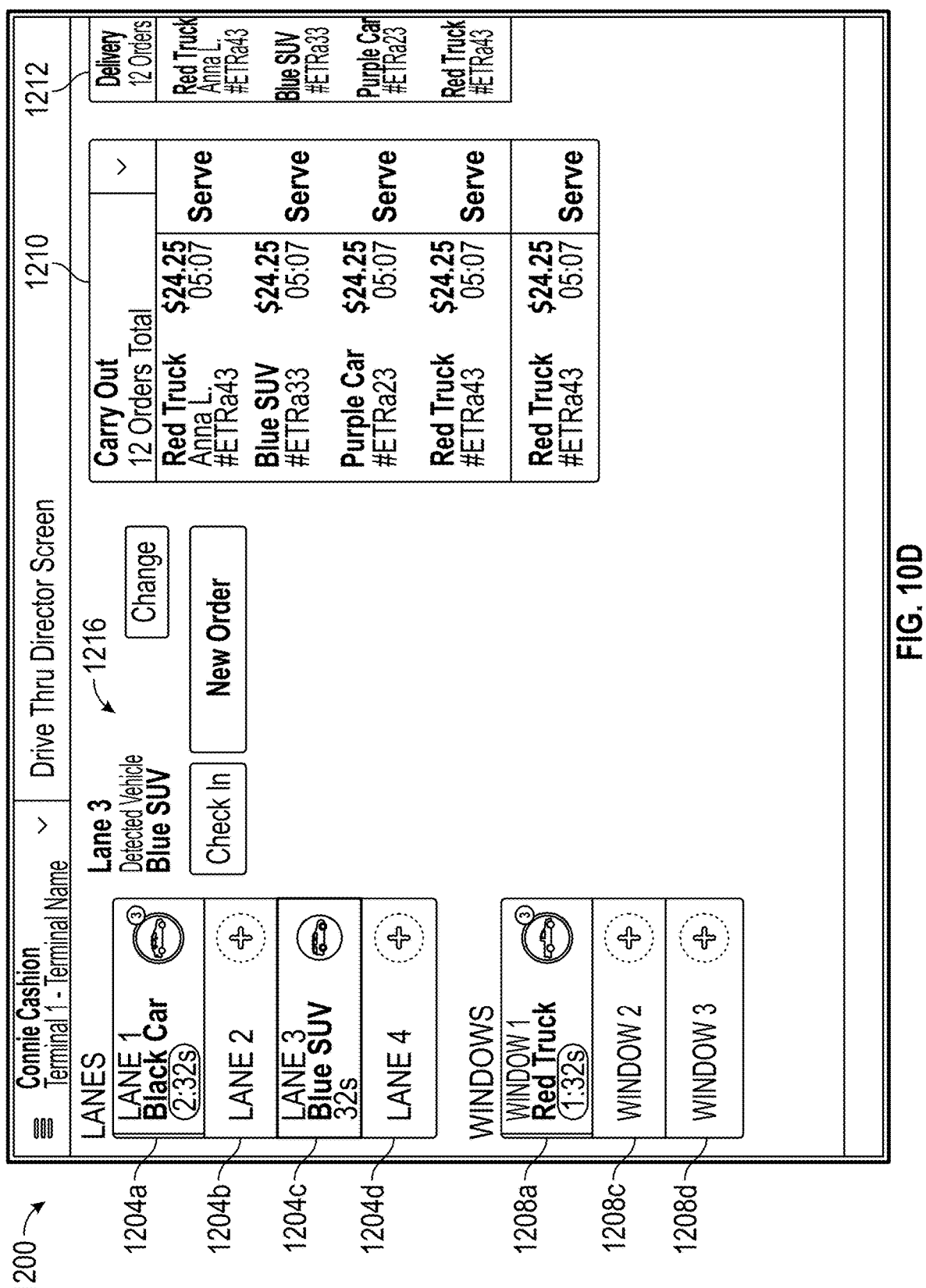
FIG. 10D is a diagram of another user interface presented to an order taker of the drive through system of FIG. 1 on a point of sale unit, according to some embodiments.

Referring to FIG. 10D, the GUI 1200 is shown including a new order window 1216 for a correspondingly detected vehicle (e.g., a blue SUV) at the third lane 20c. As shown in FIG. 10D, the order taker has pressed the icon 1204c (shown highlighted) and thereby established communications with the customer of the blue SUV at the third lane 20c. The new order window 1216 includes a check in button and a new order button. Responsive to selection of the new order button, the GUI 1200 may populate a menu window or widget such that the order taker can add items to the customer's order. Similarly, responsive to selection of the check in button and authentication of the customer (e.g., via account access, code scan, entry of phone number, entry of name, etc.) that customer's order may be retrieved (e.g., from the cloud computing system 104) and presented to the order taker via the GUI 1200.

Figure 10E:
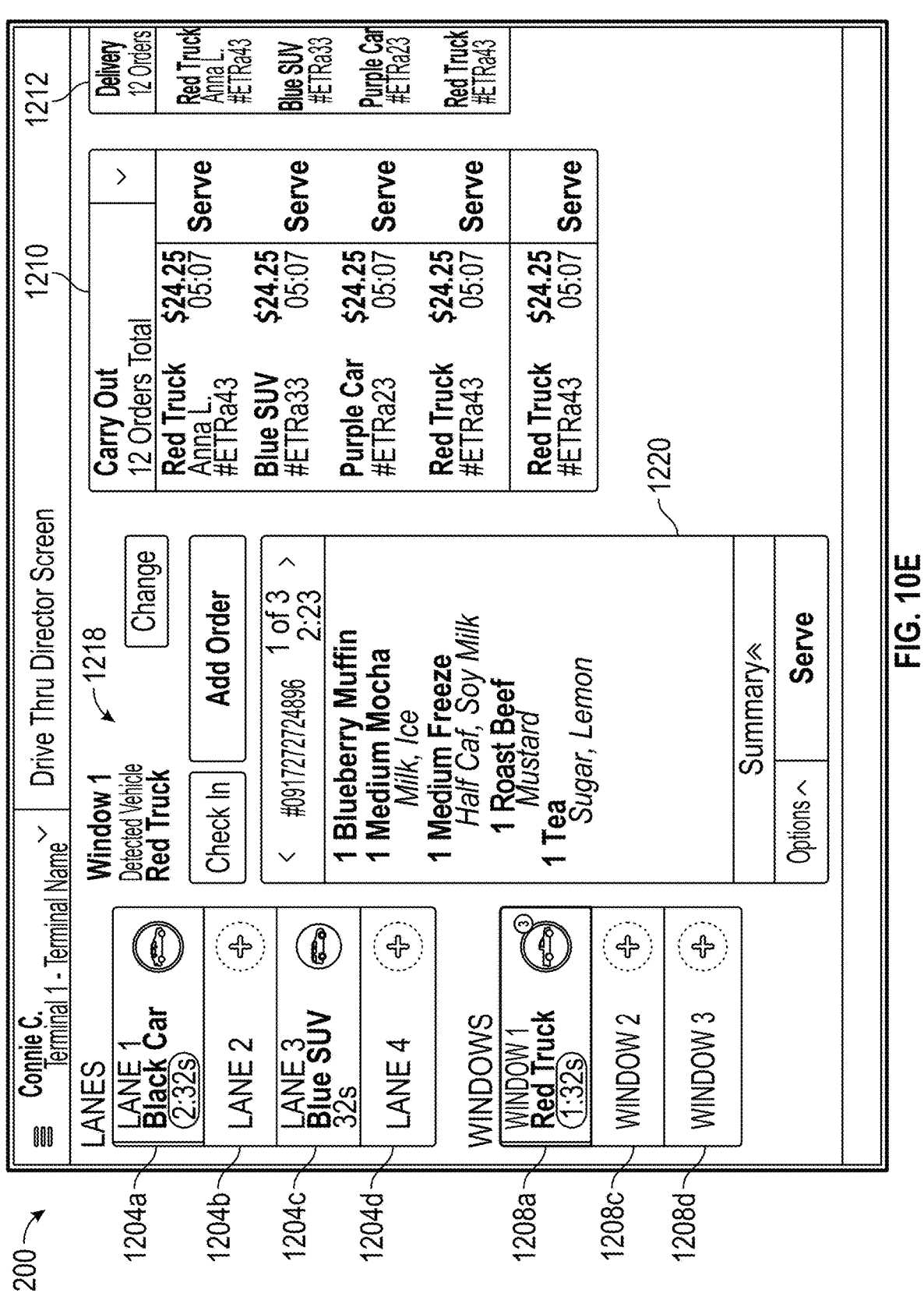
FIG. 10E is a diagram of another user interface presented to an order taker of the drive through system of FIG. 1 on a point of sale unit, according to some embodiments.
Figure 11:
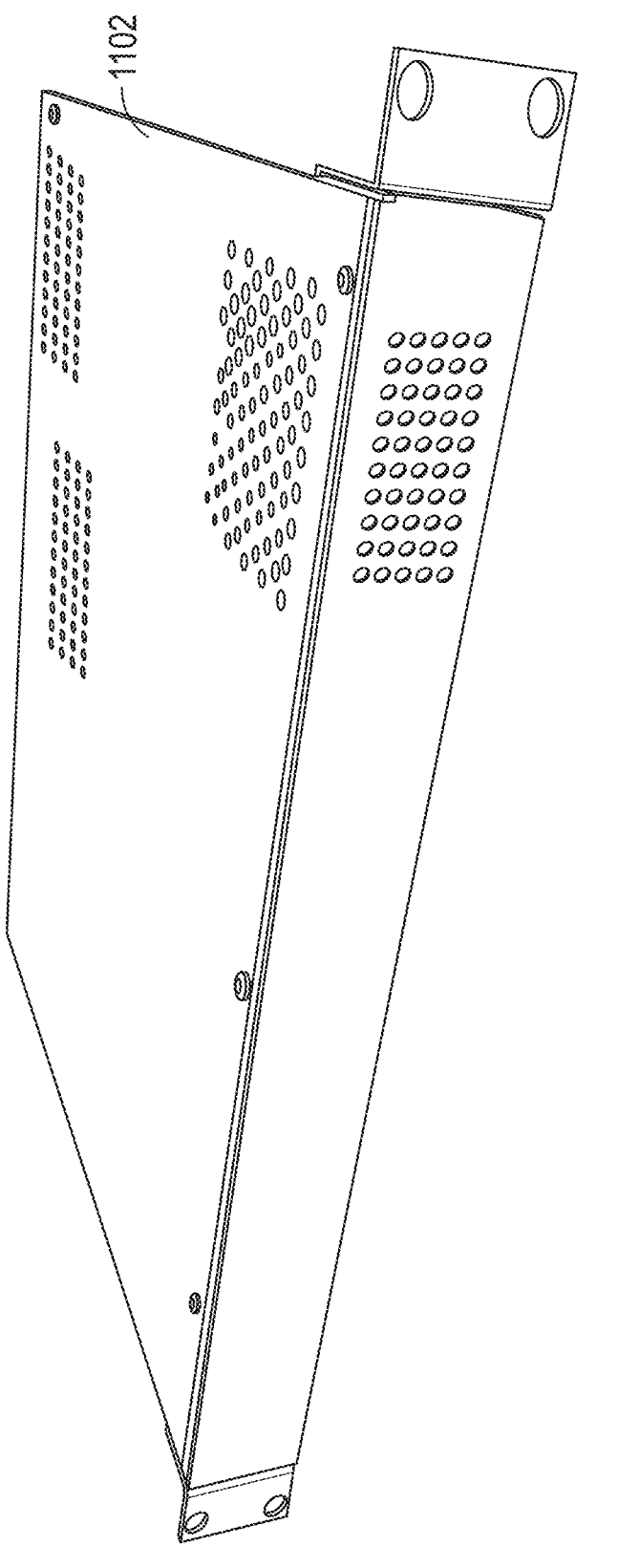
FIG. 11 is a diagram of a controller of the drive through system of FIG. 1 implemented in a single modular unit, according to some embodiments.

Referring to FIG. 10E, the GUI 1200 may display to the order taker an order for the customer detected at the window, responsive to selection of the panes 1208a-1208c. For example, when the customer in the red truck arrives at the first window 28a, and the order taker selects the pane 1208a (e.g., an icon of the first window), the controller 102 may populate an order pane 1220 of a window module or widget 1218, illustrating details of the red truck customer's order such that the customer's order may be fulfilled and handed to the customer.

Drive Through Controller Implementation

Figure 12:
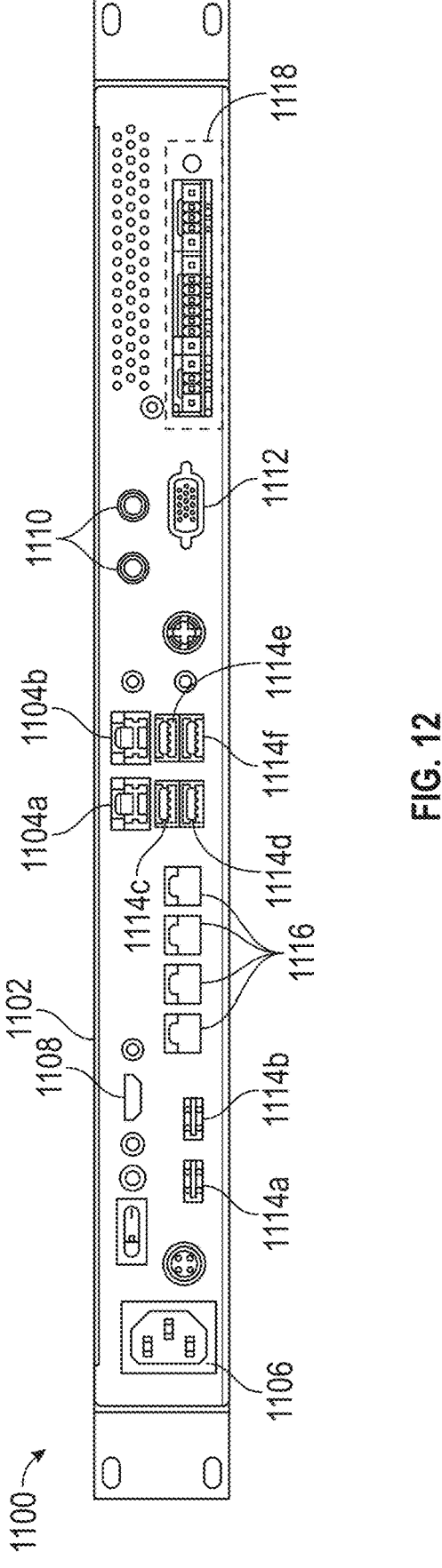
FIG. 12 is a rear view of the controller of FIG. 11 illustrating input and output data ports, according to some embodiments.

Referring to FIGS. 11-13C, the controller 102 may be implemented as a server unit 1100 having a housing 1102 configured to be secured on a server rack or computer rack, according to some embodiments. In some embodiments, the controller 102 includes one or more circuit boards that are disposed within the housing 1102. As shown in FIG. 12, the server 1100 may include a power port 1106 for providing electrical power to the one or more circuit boards of the server 1100. The server 1100 also includes a High Definition Multimedia Interface ("HDMI") port 1108, a pair of wireless communications ports 1110 for a WiFi 802.11ac router and a Bluetooth v4.2 module or for a pair of WiFi 2.4 or 5 GHz antennas. The server 1110 also includes a pair of network interfaces, shown as network interface 1104a and network interface 1104b. The network interface 1104a and the network interface 1104b may be dual Intel Gigabit local area network ("LAN") interfaces, an Intel WG 1219LM physical layer ("PHY") interface, an Intel LAN 1210AT interface, etc.

The server unit 1100 may also include four serial interfaces, shown as RS232 interfaces 1116, and an additional six USB interfaces, shown as USB interface 1114a, USB interface 1114b, USB interface 1114c, USB interface 1114d, USB interface 1114e, and USB interface 1114f. In some embodiments, the USB interface 1114a and the USB interface 1114b are for internal communications (e.g., to communicate with devices that are within the store 14 such as base stations). In some embodiments, the USB interfaces 1114c-1114d are for customer-facing and/or external communications (e.g., to communicate with devices that are outside of the store 14 such as drive through units 108, vehicle detection systems, etc.). The server unit 1100 may also include an HDMI or Video Graphics Array ("VGA"), shown as media interface 1112. Referring still to FIG. 12, the server unit 1100 may include a voice communications circuit board 1118 having inputs and outputs described in greater detail with reference to FIGS. 13A-13C. In some embodiments, the server unit 1100 includes an Intel Core i5-9400 processor with 6 cores. The server unit 1100 may also have a speed of 90 GHz, or 10 GHz. In some embodiments, the server unit 1100 includes four 10 GHz Turbo LGA1151 300 Series 65 W processors. In some embodiments, the server unit 1100 includes 32 gigabytes ("GB") of DDR4 Random Access Memory ("RAM"). In some embodiments, the server unit 1100 includes memory having a 500 GB capacity.

Figures 13A, 13B, 13C:
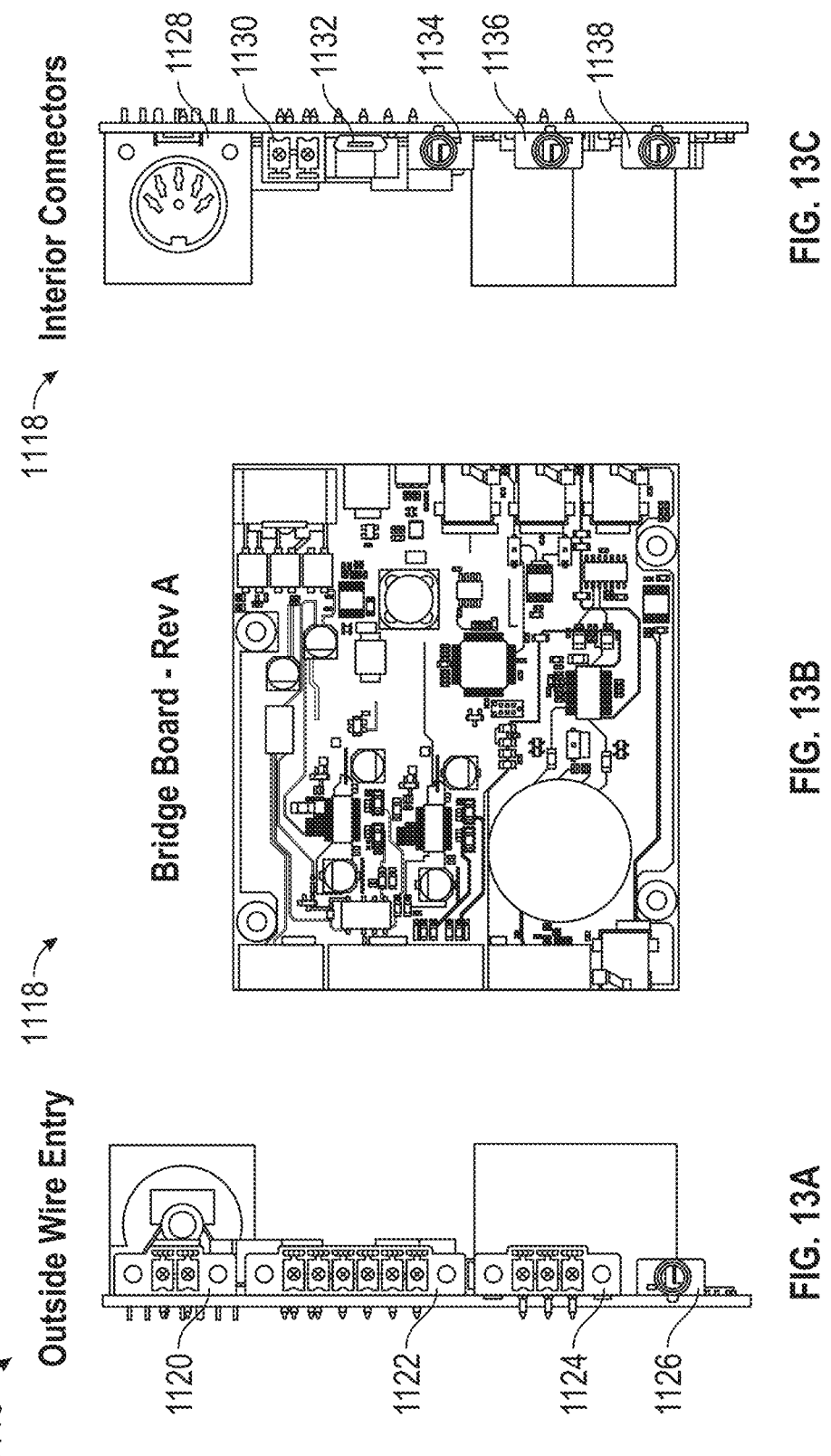
FIG. 13A is a side view of a bridge or voice board of the controller of FIG. 11 illustrating external data communications ports, according to some embodiments.
FIG. 13B is an illustration of the bridge or voice board of the controller of FIG. 11, according to some embodiments.
FIG. 13C is a side view of the bridge board or voice board of the controller of FIG. 11 illustrating internal data communications ports, according to some embodiments.

Referring particularly to FIGS. 13A and 13B, the voice communications circuit board 1118 may include one or more external interfaces including a vehicle detection interface 1120 configured to receive data inputs for vehicle detection data, a speaker interface 1122 configured to receive or output base station speaker data (both input and output), order point speaker data (both input and output), and auxiliary speaker data (both input and output). The voice communications circuit board 1118 may also include a first microphone interface 1124 and a second microphone interface 1126 for receiving and/or outputting microphone data for a drive through microphone (e.g., a microphone of the drive through units 108).

Referring particularly to FIG. 13C, the voice communications circuit board 1118 may include one or more internal interfaces. The internal interfaces include a power interface 1128 for powering the voice communications circuit board 1118, an operator interrupt interface 1130 for interrupting voice signals provided by the voice communications circuit board 1118, and a USB interface 1132. The voice communications circuit board 1118 may also include a serial communications line for providing data outputs to a base station, shown as base station interface 1134. In some embodiments, the voice communications circuit board 1118 also includes a serial input interface 1136 for communicating with a main circuit board or central processing unit of the server unit 1100 and a serial output interface 1138 for communicating with the main circuit board or central processing unit of the server unit 1100.

Configuration of Exemplary Embodiments

As utilized herein, the terms "approximately," "about," "substantially," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, and/or illustrations of possible embodiments (and such terms are not intended to connote that such embodiments are necessarily extraordinary or superlative examples).

The term "coupled," as used herein, means the joining of two members directly or indirectly to one another. Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. Such members may be coupled mechanically and/or electrically.

The term "or," as used herein, is used in its inclusive sense (and not in its exclusive sense) so that when used to connect a list of elements, the term "or" means one, some, or all of the elements in the list. Conjunctive language such as the phrase "at least one of X, Y, and Z," unless specifically stated otherwise, is understood to convey that an element may be either X, Y, Z; X and Y; X and Z; Y and Z; or X, Y, and Z (i.e., any combination of X, Y, and Z). Thus, such conjunctive language is not generally intended to imply that certain embodiments require at least one of X, at least one of Y, and at least one of Z to each be present, unless otherwise indicated.

References herein to the positions of elements (e.g., "top," "bottom," "above," "below," etc.) are merely used to describe the orientation of various elements in the FIG- URES. It should be noted that the orientation of various elements may differ according to other exemplary embodiments, and that such variations are intended to be encompassed by the present disclosure.

The hardware and data processing components used to implement the various processes, operations, illustrative logics, logical blocks, modules and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device, etc.) may include one or more devices (e.g., RAM, ROM, Flash memory, hard disk storage, etc.) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit and/or the processor) the one or more processes described herein. References to "a" or "the" processor should be understood to encompass a plurality of processors individually or collectively configured to carry out operations as described herein.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

It is important to note that the arrangement of the system as shown in the various exemplary embodiments is illustrative only. Although only a few embodiments have been described in detail in this disclosure, many modifications are possible. All such modifications are intended to be included within the scope of the present disclosure. Other substitutions, modifications, changes, and omissions may be made in the design and arrangement of the exemplary embodiments without departing from the scope of the present disclosure.

It should be understood that any of (e.g., one or more of, all of, each of, at least one of, a majority of, etc.) the wearable communications devices 112, the drive through units 108, the point of sale units, the order taking stations 110, the base stations, etc., as described herein may be configured to perform any of the functions described with reference to FIGS. 1-13 and can include any of the structure required for performing the associated functions as described herein. For example, each of the point of sale units 302 or the point of sale units 702 may include a display screen and may be configured to perform the associated functions as described herein, according to some embodiments. According to some embodiments, one or more of the point of sale units 302 or the point of sale units 702 include a display screen and are configured to perform the associated functions as described herein, while one of more of the point of sale units 302 or the point of sale units 702 do not include a display screen.

What is claimed is:

1. A communications system for a drive-through, the communications system comprising:
   a plurality of field communications interfaces including a speaker and a microphone;
   a portable communications device transportable by a user of the drive-through, the portable communications device configured to communicate according to a plurality of audio channels corresponding to the plurality of field communications interfaces; and
   processing circuitry configured to:
      operate a graphical user interface (GUI) to prompt the user to provide a user input to switch audio channels in response to both (i) detecting a vehicle at one of the plurality of field communications interfaces, and (ii) the portable communications device not being connected on one of the plurality of audio channels corresponding to one of the plurality of field communications interfaces; and
      in response to obtaining the user input, switch the portable communications device to the one of the plurality of audio channels and conduct audio communication between the user and a customer of the one of the plurality of audio channels.

2. The communications system of claim 1, wherein either (a) all of the plurality of field communications interfaces comprise the speaker and the microphone and are provided together with a display screen or (b) one or more of the plurality of field communications interfaces comprise the speaker and the microphone disposed separately from and positioned proximate to a display screen.

3. The communications system of claim 1, wherein the portable communications device is a first of a plurality of portable communications devices, the communications system further comprising a plurality of point of sale interfaces, wherein the user input is configured to be obtained at any of the plurality of point of sale interfaces to transition a corresponding one of the plurality of portable communications devices to one of the plurality of audio channels, or at any of the plurality of portable communications devices.

4. The communications system of claim 1, wherein the portable communications device is a first of a plurality of portable communications devices, wherein the processing circuitry is configured to update display screens of all of a plurality of point of sale interfaces to provide a visual indication as to which of the plurality of audio channels one of the plurality of portable communications devices is connected.

5. The communications system of claim 3, wherein the plurality of point of sale interfaces comprise touch screen devices, wherein the touch screen devices are configured to both (a) provide the GUI to visually indicate which of the plurality of field communications interfaces at which a vehicle currently present, and to visually indicate which of the plurality of field communications interfaces at which the vehicle has not yet been served, and (b) receive the user input as a selection of one of the plurality of field communications interfaces.

6. The communications system of claim 5, wherein the GUI of the plurality of point of sale interfaces is further configured to present menu data and receive user selections to add items to an order and implement a point of sale.

7. The communications system of claim 1, wherein the processing circuitry is further configured to:
   obtain sensor data indicative of a presence of a vehicle at one of the plurality of field communications interfaces; and
   operate a display screen of a point of sale interface to notify the user regarding the presence of the vehicle at the one of the plurality of field communications interfaces to prompt the user to provide the user input, the point of sale interface configured to receive the user input to initiate transition of the portable communications device to the one of the plurality of audio channels.

8. A drive through system for a drive-through, the drive through system comprising:
   a plurality of drive through interfaces positioned at a plurality of lanes, one or more of the plurality of drive through interfaces including a speaker and a microphone;
   a plurality of portable communications devices;
   a plurality of point of sale interfaces, one or more of the plurality of point of sale interfaces comprising a display screen and configured to receive an input; and
   processing circuitry configured to:
      operate the display screen of the one or more of the plurality of point of sale interfaces to provide a graphical user interface (GUI) including (i) a plurality of icons corresponding to a plurality of audio communications channels for the plurality of drive through interfaces, and (ii) an indication of one of the plurality of icons to prompt a user to select the one of the plurality of icons as the input; and in response to receiving the input, transition the portable communications device for which the input is received to communicate on one of the plurality of audio communications channels corresponding to the one of the plurality of icons.

9. The drive through system of claim 8, wherein each of the plurality of drive through interfaces are configured to communicate on a corresponding one of the plurality of audio communications channels.

10. The drive through system of claim 8, wherein the plurality of portable communications devices include a microphone and a speaker, the speaker configured to emit sound in response to receiving audio data or audio signals, and the microphone configured to receive sound and generate audio data or audio signals.

11. The drive through system of claim 8, further comprising a vehicle detection system configured to detect a presence of a customer vehicle at any of the plurality of drive through interfaces.

12. The drive through system of claim 8, wherein the plurality of portable communications devices are additionally communicably coupled on a universal channel in a listen-only mode, the drive through system further comprising a master communications device configured to broadcast an announcement to all of the plurality of portable communications devices via the universal channel.

13. The drive through system of claim 8, wherein the processing circuitry is configured to operate the display screen to provide the indication in response to detecting a vehicle at one of the plurality of drive through interfaces based on image data from a camera.

14. The drive through system of claim 8, wherein the processing circuitry is further configured to coordinate communication between the plurality of portable communications devices via one or more internal audio communications channels.

15. A drive through system for a drive-through comprising:

a plurality of drive through interfaces including a speaker and a microphone, the plurality of drive through interfaces positioned at separate lanes;

a portable communications device configured to be worn by a user of the drive-through; and processing circuitry, configured to:

operate a display screen to alter an appearance of a selectable icon to prompt the user to provide a user input to switch audio channels in response to both (i) detecting a vehicle at one of the plurality of drive through interfaces, and (ii) the portable communications device not being connected on one of a plurality of audio channels corresponding to the one of the plurality of drive through interfaces, and to notify the user that the portable communications device is not currently connected to the one of the plurality of drive through interfaces; and in response to receiving a selection of the selectable icon, operate the portable communications device to communicate with the one of the plurality of drive through interfaces.

16. The drive through system of claim 15, wherein the plurality of drive through interfaces comprises four drive through interfaces, each of the plurality of drive through interfaces configured to communicate on a corresponding audio communications channel.

17. The drive through system of claim 15, wherein the portable communications device is configured to wirelessly communicate with an interface comprising a wireless transceiver and physically coupled with a first audio input-output communications module of an audio switchboard on which the processing circuitry is implemented, the audio switchboard further comprising a second audio input-output communications module communicably coupled with the plurality of drive through interfaces, wherein the audio switchboard comprises an audio router configured to define a plurality of audio channels to selectively communicably couple the portable communications device with any of the plurality of drive through interfaces.

18. The drive through system of claim 15, wherein the portable communications device is a first of a plurality of portable communications devices, the drive through system further comprising a plurality of point of sale interfaces, wherein the processing circuitry is configured to cause display screens of all of the plurality of point of sale interfaces to be updated to provide a visual indication of which of a plurality of audio channels one of the plurality of portable communications devices are currently connected to.

19. The drive through system of claim 18, wherein the plurality of point of sale interfaces comprise touch screen devices, wherein the touch screen devices are configured to both (a) provide a graphical user interface (GUI) to visually indicate which of the plurality of drive through interfaces at which a vehicle currently present, and to visually indicate which of the plurality of drive through interfaces at which the vehicle has not yet been served, and (b) receive the selection of one of the plurality of drive through interfaces.

20. The drive through system of claim 15, wherein the processing circuitry is further configured to:

obtain sensor data indicative of a presence of a vehicle at one of the plurality of drive through interfaces; and operate the display screen to notify the user regarding the presence of the vehicle at the one of the plurality of drive through interfaces to prompt the user to provide the selection, the display screen being a screen of a point of sale interface, the point of sale interface configured to receive the selection to initiate transition of the portable communications device to the one of a plurality of audio channels.

* * * * *